US012701438B2

(12) United States Patent
Cui et al.

(10) Patent No.: US 12,701,438 B2
(45) Date of Patent: Aug. 4, 2026

(54) ENHANCED AUTOMATIC NEIGHBOR RELATION (ANR) TO SUPPORT ADVANCED RAN ATTRIBUTES

(71) Applicant: AT&T Intellectual Property I, L.P., Atlanta, GA (US)

(72) Inventors: Zhi Cui, Sugar Hill, GA (US); Hongyan Lei, Plano, TX (US); Ye Chen, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 18/638,128

(22) Filed: Apr. 17, 2024

(65) Prior Publication Data

US 2025/0330837 A1      Oct. 23, 2025

(51) Int. Cl.
*H04W 24/02*      (2009.01)
*H04W 64/00*      (2009.01)

(52) U.S. Cl.
CPC ......... *H04W 24/02* (2013.01); *H04W 64/003* (2013.01)

(58) Field of Classification Search
CPC ............................ H04W 24/02; H04W 64/003
See application file for complete search history.

(56) References Cited

U.S. PATENT DOCUMENTS

2013/0097598 A1* 4/2013 Schroeder ............. G06F 9/5077
718/1

OTHER PUBLICATIONS

"NR and NG-RAN Overall description; Stage-2", ETSI TS 138 300 V16.4.0 (Jan. 2021), Jan. 2021, 151 pages.
Niklasson, Roger , et al., "An intelligent platform: The use of O-RAN's SMO as the enabler for openness and innovation in the RAN domain", Nov. 2021, 22 pages.

* cited by examiner

*Primary Examiner* — Curtis B Odom
(74) *Attorney, Agent, or Firm* — Guntin & Gust, PLC; Mark Wilinski

(57)      ABSTRACT

Aspects of the subject disclosure may include, for example, determining, in relation to a communication node, a neighboring node of a wireless network, wherein the neighboring node comprises a baseband processor in communication with a radio frequency (RF) subsystem. A determination is made regarding one of a spatial configuration, a hosting infrastructure configuration, or both, of the neighboring node. The spatial configuration includes one of a divided configuration, including geographically separated centralized and a distributed baseband units, and an undivided configuration including an undivided baseband unit. The hosting infrastructure configuration distinguishes a physical configuration having the baseband processor includes dedicated compute resources allocated to the node, from a virtual configuration having a virtual baseband processor hosted on shared compute resources. An association between the spatial configuration, the hosting infrastructure configuration, or both, and the neighboring node facilitates mobility within the wireless communication network. Other embodiments are disclosed.

20 Claims, 12 Drawing Sheets

285

NG-RAN Xn-AP: NG-RAN Node Configuration Update*
(RAT, 5G gNB-DU ID, 5G gNB-CU ID, Virtual/physical, CRAN/DRAN IE in
Served Cell Information NR IE**, other IEs)

282

NG-RAN Xn-AP: NG-RAN Node Configuration Update ACK

283 vCU_2
281b vCU_1
281a

280

285

300

600

ENHANCED AUTOMATIC NEIGHBOR RELATION (ANR) TO SUPPORT ADVANCED RAN ATTRIBUTES

FIELD OF THE DISCLOSURE

The subject disclosure relates to enhanced automatic neighbor relation (ANR) to support advanced radio access network (RAN) attributes.

BACKGROUND

The advancement of 5G and 6G networks has relied upon network virtualization for improved programmability and faster time-to-market. A current trend in the radio access network (RAN) is decomposition, in which a RAN baseband unit (BBU) is divided into two parts: a non-real-time functions, referred to as a central unit (CU), and a real-time RAN functions, referred to as a distributed unit (DU).

The traditional RAN, also known as classical RAN, refers to a non-virtualized BBU, which can be located at a central location, i.e., cRAN, or at a cell site, i.e., dRAN. On the other hand, virtualized RAN (vRAN) refers to a virtualized BBU, i.e., virtualized CU and DU, functions. The virtualized central unit (vCU) is likely to be centralized, while the virtualized distributed unit (vDU) may be either be centralized, i.e., vRAN on cRAN, or distributed to the cell site, i.e., vRAN on dRAN.

BRIEF DESCRIPTION OF THE DRAWINGS

Reference will now be made to the accompanying drawings, which are not necessarily drawn to scale, and wherein.

DETAILED DESCRIPTION

Figure 1:
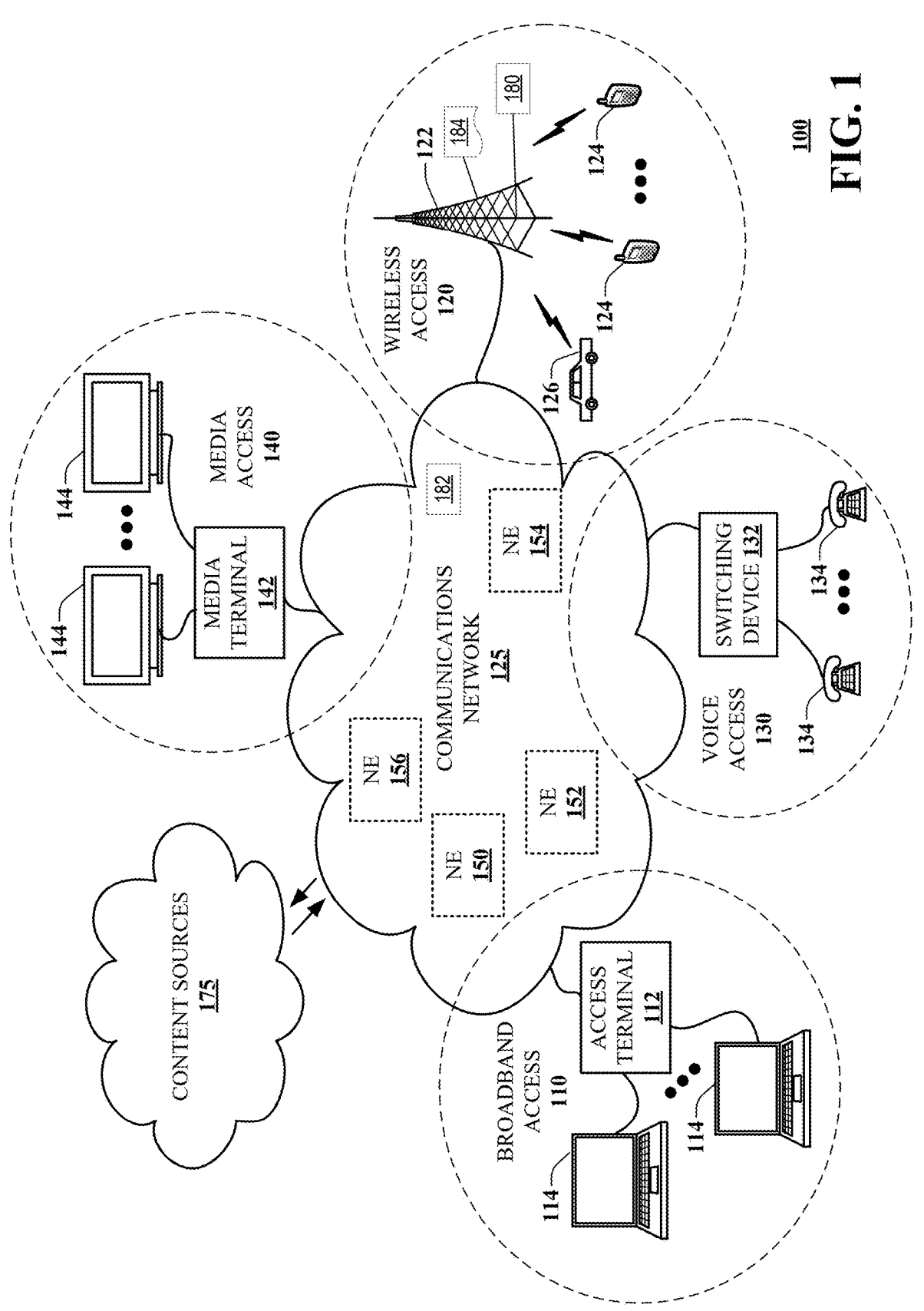
FIG. 1 is a block diagram illustrating an exemplary, non-limiting embodiment of a communications network in accordance with various aspects described herein.

The subject disclosure describes, among other things, illustrative embodiments for determining, with respect to a mobile communication node, one of a spatial configuration, a hosting processor configuration, or a combination of both, for a neighboring mobile communication node. The spatial configuration distinguishes a divided baseband unit configuration from an undivided baseband unit configuration. According to the divided configuration, the baseband unit includes a centralized component geographically separated form a distributed component, which may be proximal to an RF unit located at the mobile node site. According to the undivided configuration, an undivided baseband unit may be collocated with the RF unit at the mobile node site. The hosting infrastructure configuration distinguishes a physical infrastructure from a virtual infrastructure. According to a physical infrastructure, the baseband unit may be hosted on physical compute resources dedicated for the neighboring mobile communication, while according to a virtual infrastructure, at least a portion of the neighboring mobile communication node may be hosted on a virtual machine, e.g., according to a cloud infrastructure. Other embodiments are described in the subject disclosure.

One or more aspects of the subject disclosure include a process that includes detecting, by a processing system including a processor, a neighboring communication node of a group of communication nodes of a wireless mobile communication network, wherein the neighboring communication node includes a baseband processor in communication with a radio frequency (RF) subsystem. The process further includes identifying, by the processing system, a spatial configuration of the neighboring communication node, wherein the spatial configuration includes one of a divided configuration, in which the baseband processor is divided into a centralized component geographically separated from a distributed component proximal to the RF subsystem, and an undivided configuration, in which the baseband processor is a unitary component proximal to the RF subsystem. The process further includes, storing, by the processing system, a first association of the spatial configuration with an indication of the neighboring communication node to obtain a stored first association of the spatial configuration, wherein the stored first association of the spatial configuration facilitates mobility of user equipment within the wireless mobile communication network.

One or more aspects of the subject disclosure include a non-transitory, machine-readable medium, that includes executable instructions that, when executed by a processing system including a processor, facilitate performance of operations. The operations include identifying a neighboring communication node of a number of communication nodes of a wireless mobile communication network, wherein the neighboring communication node comprises a baseband processor in communication with a radio frequency (RF) subsystem. The operations further include, determining a spatial configuration of the neighboring communication node, wherein the spatial configuration includes one of a divided configuration, in which the baseband processor includes a centralized unit geographically separated from the RF subsystem and a distributed unit proximal to the RF subsystem, and an undivided configuration, in which the baseband processor is an undivided baseband unit proximal to the RF subsystem. The operations further include associating the spatial configuration with an indication of the neighboring communication node to obtain a first association of the spatial configuration, wherein the first association of the spatial configuration facilitates mobility of user equipment within the wireless mobile communication network.

One or more aspects of the subject disclosure include a system, including a processing system having a processor and a memory that stores executable instructions that, when executed by the processing system, facilitate performance of operations. The operations include determining, in relation to a communication node of a wireless communication network, a neighboring communication node of a group of communication nodes of the wireless communication network, wherein the neighboring communication node includes a baseband processor in communication with a radio frequency (RF) subsystem. The operations further include, determining one of a spatial configuration of the neighboring communication node, a hosting infrastructure configuration of the neighboring communication node, or a combination thereof. The spatial configuration includes one of a divided configuration, in which the baseband processor includes a centralized baseband component geographically separated from a distributed baseband component proximal to the RF subsystem, and an undivided configuration, in which the baseband processor is proximal to the RF subsystem. The hosting infrastructure configuration distinguishes a physical configuration, in which the baseband processor is hosted on dedicated compute resources allocated to a base transceiver station, from a virtual configuration, in which the baseband processor is a virtual baseband processor hosted on a virtual machine. The operations further include associating one of the spatial configuration, the hosting infrastructure configuration, or the combination thereof, with an indication of the neighboring communication node to obtain an association, wherein the association facilitates mobility of user equipment within the wireless communication network.

It is anticipated that transition to a fully virtualized RAN will take several years and during this time, both physical (non-virtualized) and virtualized RAN will coexist in the operator's network. Furthermore, the placement of CU/DU functions (cRAN vs dRAN) will vary due to different cell site distributions. This disclosure introduces enhanced automatic neighbor relations (ANR) as a key enabler of 5G/6G RAN. The enhanced ANR captures configuration nuances, e.g., including divided BBU and/or virtualization, which facilitates mobility management across virtualized and physical, as well as cRAN and dRAN.

The enhanced ANR may include one or more additional attributes to indicate whether a RAN is configured according to a physical system configuration and/or according to a virtual configuration. It is recognized that network virtualization offers advantages that include, without limitation, improved programmability and faster time-to-market. Alternatively, or in addition, the enhanced ANR may include one or more additional attributes to indicate whether a RAN is configured according to a centralized vs. distributed RAN. It is envisioned that in at least some embodiments, the enhanced ANR may include further information, such as identifiers for system components, such as a gNB-CU identifier (ID) and/or a gNB-DU ID for the hierarchical structure of a decomposed RAN.

According to a divided baseband unit (BBU) configuration, a decomposition of the BBU in the RAN creates at least two separate units, a centralized or central unit (CU) for non-real time RAN functions and a distributed unit (DU) for real-time RAN functions. Without limitation, the CU may be configured to implement one or more non-real time RAN functions, while the DU may be configured to implement one or more real-time RAN functions. These RAN functions may include mobility functions, according to one or more applicable mobile communication protocols and/or baseband processing functions as may be applicable to operation of a base transceiver station (BTS).

It is understood that each individual 5G new radio (NR) base transceiver station (BTS) is not required to support an individual ANR record or table, i.e., an individual enhanced ANR table. Instead, a centralized vCU, e.g., for a vRAN, and BBU, for physical RAN, hosts a neighbor cell relation table (NCRT) on behalf of some or all of the BTSs supported by the vCU and/or BBU. It is likely that some combination of physical, i.e., non-virtualized, and virtualized RAN (vRAN) will coexist in an operator's network during a likely transition to full virtualization. In some instances, such mixed architectures may complicate mobility management, while at the same time presenting opportunities for optimization. The techniques disclosed herein, including an enhanced ANR may be applied to facilitate optimization of mobility management across different deployment scenarios, including virtualized and physical RAN, as well as centralized and distributed RAN functions.

In addition, the RAN baseband unit (BBU) decomposition creates two separate units, the central unit (CU) for non-real-time functions and the distributed unit (DU) for real-time functions, and both physical (non-virtualized) and virtualized RAN (VRAN) will coexist in the operator's network during the transition to full virtualization. This results in the need for optimized mobility management across different deployment scenarios, including virtualized and physical RAN, as well as centralized and distributed RAN functions. Beneficially, the application of an enhanced NR (neighbor relations) and/or ANR (automated neighbor relations) table and the enhanced message structure supporting the example enhanced RAN attributes, provide a key enabler in mobile communication systems, including LTE, 5G, and/or 6G RAN, to enhance, improve and/or otherwise optimize mobility management. A RAN controller can have a map of the ANR table across multiple RATs, classic RAN/virtualized RAN, and CRAN/DRAN. This overall/centralized ANR table can be used as input to mobility optimization. For example, RAN configuration and/or architectural details identified in the enhanced ANR table may be used by mobile network equipment, e.g., the RAN, to select a preferred, e.g., a best and/or most efficient, anchor cell across virtualized and physical, as well as distributed and centralized RANs.

By way of example, use cases are provided herein for utilizing an enhanced ANR table to improve, enhance and/or otherwise optimize mobility handover events and/or load balancing. For example, for a serving physical DRAN, high priority may be given to a physical DRAN neighbor and/or high priority to the physical CRAN neighbor, e.g., over virtual alternatives. Such preservation of configuration continuity may offer advantages to mobile equipment, served applications, and/or management of network resources, e.g., RAN resources. Alternatively, or in addition, for a serving physical CRAN, high priority may be given to a physical CRAN neighbor. For a serving virtualized cRAN, high priority may be given to a virtualized CRAN neighbor. Alternatively, or in addition, other configuration information from an enhanced ANR table, e.g., identifying a CU as serving multiple DU and/or BBU, may be used for handover and/or load balancing, e.g., facilitating such events by selecting neighbors served by the same CU. Such selective mobility may avoid and/or minimize a need for handing over at a border of two CUs and/or BBUs, when possible as such events require an exchange of neighbor relation information elements, e.g., in 4G LTE X2 messages and/or 5G gNB-CU Xn messages.

Referring now to FIG. 1, a block diagram is shown illustrating an example, non-limiting embodiment of a system 100 in accordance with various aspects described herein. For example, system 100 can facilitate in whole or in part determining, with respect to a mobile communication node, one of a spatial configuration, a hosting infrastructure configuration, or a combination of both, for a neighboring mobile communication node, wherein the spatial configuration distinguishes a centralized configuration in which a baseband processor is remote from an RF unit at the mobile node site and a distributed configuration in which the baseband processor is collocated with the RF unit at the mobile node site. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, one or more of the base station or access point 122 may be configured with a local baseband processing unit 180 configured to perform baseband processing related to mobile communications supported by the base station or access point 122. In some embodiments, the local baseband processing unit 180 is a unitary system, e.g., residing at or near the base station or access point 122. Alternatively, or in addition, the local baseband processing unit 180 comprises a distributed component of a divided baseband processing system configured to function cooperatively with a remote baseband processing unit 182 physically spaced apart, e.g., remote from the base station or access point 122, for example at a centralized location. According to the divided configuration, baseband processing activity is distributed among the local baseband processing unit 180 and the remote baseband processing unit 182.

It is understood that one or more of the unitary baseband processing unit 180 or the local and/or remote processing units 180, 182 of the divided configuration may be hosted according to a physical infrastructure, e.g., utilizing dedicated hardware. Alternatively, or in addition, at least a portion of the local and/or remote processing units 180, 182, may be hosted according to a virtual infrastructure in which at least a portion of the neighboring mobile communication node is hosted on a virtual machine, e.g., according to a cloud infrastructure. In at least some embodiments, the base station or access point 122 may have access to and/or otherwise retain and/or update a record of neighboring cell configurations.

By way of illustrative example, the base station or access point 122 may contain a neighbor cell relations table (NCRT) 184 identifying one or more neighboring cells as well as related attributes. In at least some embodiments, the related neighboring cell attributes may include configuration information that may include one or more of an indication of whether the neighboring cell's baseband processing unit includes a divided configuration or an undivided or unitary configuration. Alternatively, or in addition, related neighboring cell attributes may include hosting infrastructure configuration information that may include an indication of whether the neighboring cell's baseband processing unit includes a physical hosted configuration and/or a virtual hosted configuration. For divided configurations, it is understood that the local and remote processing units 180, 182 may utilize the same or different combinations of hosting infrastructure configurations. In some embodiments, attributes of the NCRT may be entered and/or updated manually, e.g., during a system configuration and/or operation and maintenance activity. Alternatively, or in addition, attributes of the NCRT may be entered and/or updated automatically, e.g., according to an automated neighbor relations (ANR) function. In at least some embodiments, the ANR function may be adapted to determine a divided and/or undivided configuration of a baseband processor of a neighboring cell. Alternatively, or in addition, the ANR function may be adapted to determine a hosting infrastructure configuration of the baseband processor of the neighboring cell.

Figure 2A:
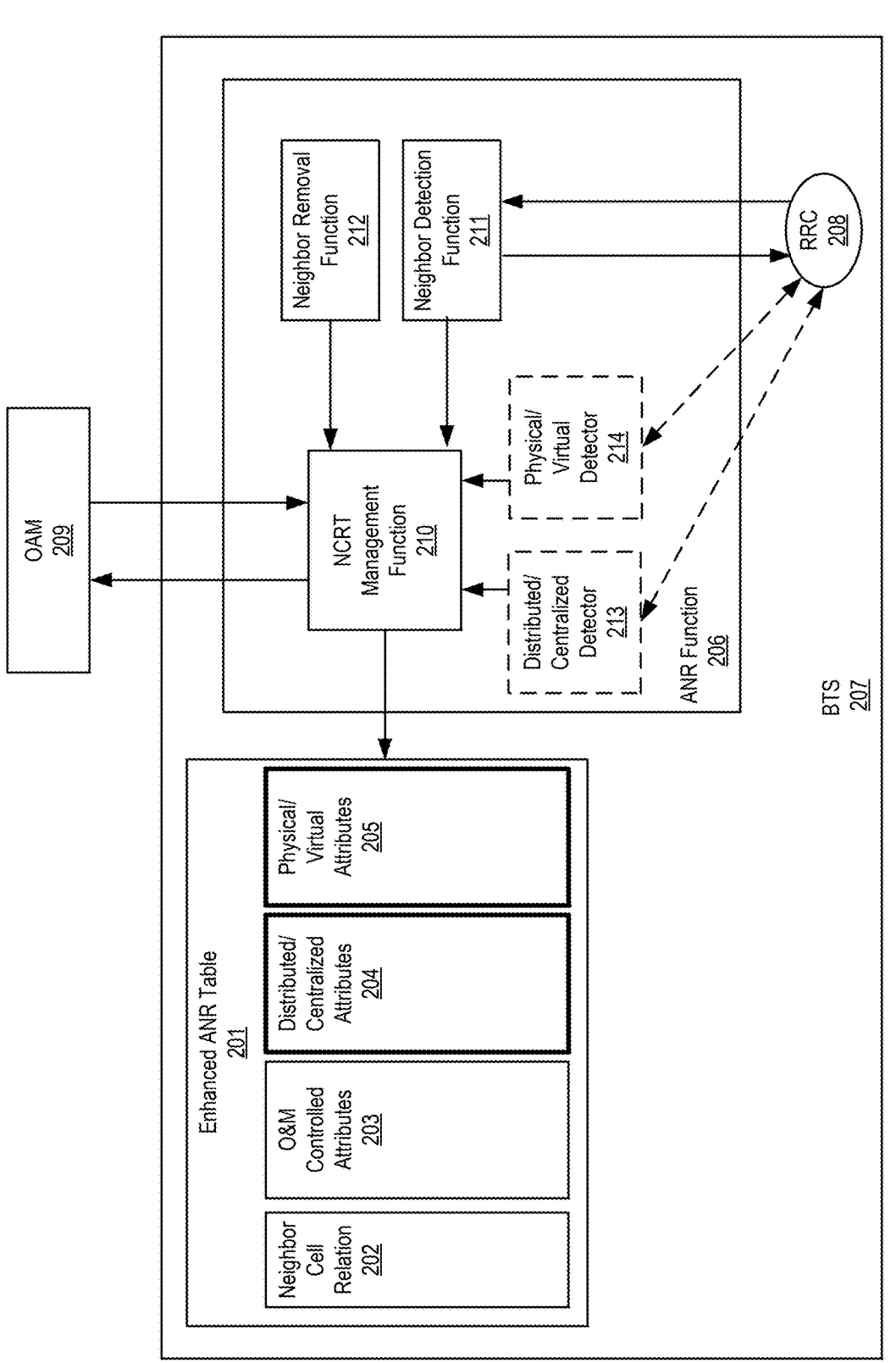
FIG. 2A is a block diagram illustrating an example, non-limiting embodiment of a portion of a base transceiver station configured for managing an enhanced automated neighbor relations (ANR) table, functioning within the communication network of FIG. 1 in accordance with various aspects described herein.

FIG. 2A is a block diagram illustrating an example, non-limiting embodiment of a portion of a base transceiver station (BTS) 200 configured for managing an enhanced automated neighbor relations (ANR) table 201, functioning within the system 100 of FIG. 1 in accordance with various aspects described herein. It is understood that the BTS 200 may include a baseband processing unit (BBU) (not shown), in communication with an RF unit (not shown), in further communication with an antenna (not shown). The BTS 200 may operate according to one or more mobility protocols, such as those established by the 3$^{rd}$ Generation Partnership Project (3GPP), to support delivery of one or more mobile services to wireless communication devices. Mobile services include, without limitation, voice, data, video, streaming media, machine type communications (MTC), automation, autonomous operation of machines, e.g., robots, vehicles, drones, and so on. Mobility protocols include, without limitation, any of the examples disclosed herein and/or otherwise generally known, including 4G, LTE, 5G, New Radio (NR), 6G, Next Generation (NG), and beyond, e.g., 5G+, 6G+, 7G.

It is understood that mobility may involve one or more wireless communication devices, e.g., user equipment (UE), that may be stationary, but not always on or active and/or mobile. Mobile UE, e.g., smart phones, smart vehicles, drones and the like, may enter, reside within, and/or depart from one or more coverage zones of the BTS 207, e.g., based on movement of the UE. It is common for a mobile service provider to provide multiple BTS to establish an extended coverage zone that may include contiguous and/or overlapping coverage of the multiple BTS to encompass a geographic coverage region greater than that of any one cell. Consequently, a UE present within a coverage area of the BTS 207 may move within a different coverage zone of another BTS (not shown). In such instances, responsibility for providing mobile services to the UE may transition from an original, or source BTS 207 to the other, or target BTS in a process generally referred to as a handover (HO) event.

As mobility may be anticipated for at least some UEs, the BTS 207 may predetermine identities of one or more neighboring cells, e.g., each cell having a BTS 207 and providing coverage within a respective cell region. Identities of the neighboring cells as well as other attributes, such as operation and maintenance (OAM) attributes, may be retained within a data structure. By way of example, one such data structure is referred to as a neighbor relations table (NRT). The NRT may include identities of neighboring cells, which may be adapted to facilitate an exchange of message between neighboring cells to facilitate mobility of UE within the mobile service provider's network and/or between different provider networks according to common and/or different radio access technologies (RAT). In at least some embodiments, a process for establishing and/or maintaining the NRT may be automated.

The example BTS 207 may represent a 6G gNodeB (gNB). The BTS 207 may include an automated neighbor relations (ANR) table 201 that may be generated and/or maintained according to an ANR function 206. In at least some embodiments, the ANR function 206 may be automated to alleviate an operator from manually managing neighbor cell relations, as described in 3GPP TS 38.300 v18.1.0, incorporated herein by reference in its entirety. According to the illustrative example, the ANR function 206 resides within the BTS 207, e.g., within the gNB, and manages a conceptual NRT. The example ANR function 206 includes a neighbor detection function 211 configured to identify and add new neighbors to the NRT. The neighbor detection function 211 may be in communication with a radio resource control (RRC) function 208 configured to issue measurement requests to radio resources and/or to receive measurement reports, e.g., as may be received in response to measurement requests. Alternatively, or in addition, the ANR function 206 includes a neighbor removal function 212 configured to remove outdated neighbor relations.

Further according to the illustrative embodiment, the ANR function 206 manages an enhanced ANR table 201. The enhanced ANR table 201 may include a neighbor cell relation portion 202 configured to retain information regarding neighbor cell relationships. Such information may include, without limitation, a neighbor record and/or reference number within the enhanced ANR table 201 and/or an identification of the neighboring cell, e.g., a target cell identifier (TCI). Alternatively, or in addition, the enhanced ANR table 201 may include an OAM controlled attribute portion 203 adapted to identify one or more OAM controlled attributes of the neighbor relation. Example attributes include, without limitation, a No Remove attribute, a No HO attribute or a No Xn attribute. Such attribute values may be determined according to an OAM controller 209.

The enhanced ANR table 201 further includes one or more of a BBU spatial attribute portion 204, a hosting infrastructure configuration attribute, sometimes referred to as a hosting configuration attribute 205, or a combination thereof. The BBU spatial attribute portion may identify whether a particular neighboring cell, e.g., as indicated by its table reference value and/or TCI value in the neighbor cell relation portion, is divided or unified. As discussed elsewhere herein, a divided BBU may include a first portion configured to perform non-time sensitive RAN functions, e.g., non-real-time RAN functions and a second portion configured to perform time-sensitive RAN functions, e.g., real-time RAN functions. According to the various examples disclosed herein the first portion may be referred to as a centralized portion or central unit (CU), suggesting that the CU may be remote, e.g., geographically separated, from an RF unit of the associated neighbor cell. The second portion may be referred to as a distributed portion or distributed unit (DU), suggesting that the DU is proximal to the RF unit. Proximity of a RAN component with a cell site, an access point and/or RF equipment as referred to herein includes, without limitation, collocation of a RAN component, e.g., the DU, with the RF unit, as well as a degree of separation as may be tolerable according to the real-time RAN functions, e.g., placing the RAN component, e.g., DU, not necessarily in and/or next to the RF unit, but perhaps at some convenient nearby location, e.g., an equipment cabinet in a controlled environment, whereas the RF unit may be at a base of an antenna tower, and/or perhaps at some elevation on the antenna tower proximal to an antenna. In at least some embodiments, proximity may be determined according to a threshold distance such as determined by provider. Alternatively, or in addition, proximity may be determined according to a physical separation distance threshold, a propagation or signal delay threshold, a message delay threshold or any combination thereof.

An undivided BBU of a neighboring cell may include a single, e.g., unitary, BBU processing system in which substantially all of the BBU RAN functions of the neighboring cell may be performed. As at least a portion of the BBU RAN functions will likely have some time sensitive aspects. Accordingly, it is envisioned that in at least some embodiments, an undivided or unitary BBU may be proximate to an RF unit of the neighboring cell. Once again, proximity may include collocation and/or a limited degree of physical separation as may be tolerable according to the protocol applications.

As also discussed elsewhere herein, a divided BBU may include a first portion configured to perform non-time sensitive RAN functions, e.g., non-real-time RAN functions and a second portion configured to perform time-sensitive RAN functions, e.g., real-time RAN functions. According to the various examples disclosed herein the first portion may be referred to as a centralized portion or central unit (CU), suggesting that the CU may be remote, e.g., geographically separated, from an RF unit of the associated neighbor cell. The second portion may be referred to as a distributed portion or distributed unit (DU), suggesting that the DU is proximal to the RF unit. Proximity includes, without limitation, collocation of the DU with the RF unit, as well as a degree of separation as may be tolerable according to the real-time RAN functions, e.g., placing the DU not necessarily in and/or next to the RF unit, but perhaps at some convenient nearby location, e.g., an equipment cabinet in a controlled environment, whereas the RF unit may be at a base of an antenna tower, and/or perhaps at some elevation on the antenna tower proximal to an antenna.

The hosting infrastructure configuration attribute, sometimes referred to as a hosting configuration attribute 205, or a combination thereof. The BBU spatial attribute portion may identify whether a particular neighboring cell, e.g., as indicated by its table reference value and/or TCI value in the neighbor cell relation portion, is divided or unified. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure.

In at least some embodiments, the example ANR function 206 includes a spatial configuration detection function 213 (shown in phantom) configured to identify a spatial configuration of a BBU, e.g., divided or undivided and updating a corresponding attribute in the enhanced ANR table 201. The spatial configuration detection function 213 may be in communication with the RRC function 208 configured to query neighboring nodes and/or receiving configuration information from neighboring nodes. Alternatively, or in addition, the ANR function 206 includes a hosting infrastructure configuration detection function 214 (shown in phantom) configured to identify a hosting infrastructure configuration of a BBU and/or CU and/or DU portions of a divided BBU and updating a corresponding attribute in the enhanced ANR table 201. The hosting infrastructure configuration detection function 214 may be in communication with the RRC function 208 configured to query neighboring nodes and/or receiving configuration information from neighboring nodes.

In at least some embodiments, the ANR function 206 may include a neighbor cell relations table (NCRT) management function 210. The NCRT management function may receive inputs from one or more of the neighbor detection function 211 or the neighbor removal function 212, identifying neighbor cells for addition and/or removal from the ANR table. The NCRT management function 210 may be adapted to update the ARN table in response to input from the example functions 211, 212, and functions 213, 214, when provided. The example BTS 207 is in further communication with an operation and management (OAM) system 209. With respect to the ANR table 201, the NCRT management function may provide the enhanced ANR table 201 and/or any portion thereof to the OAM system 209. Alternatively, or in addition, the NCRT management function may receive neighboring cell attributes from the OAM system 209. Accordingly, the NCRT management function 210 receive indications of one or more of distributed/centralized attributes or physical/virtual attributes from the OAM system 209 and update the BBU spatial attribute portion 204 or physical/virtual, i.e., hosting configuration attributes 205 of the enhanced ANR table 201 in association with the respective neighboring cell records.

Figure 2B:
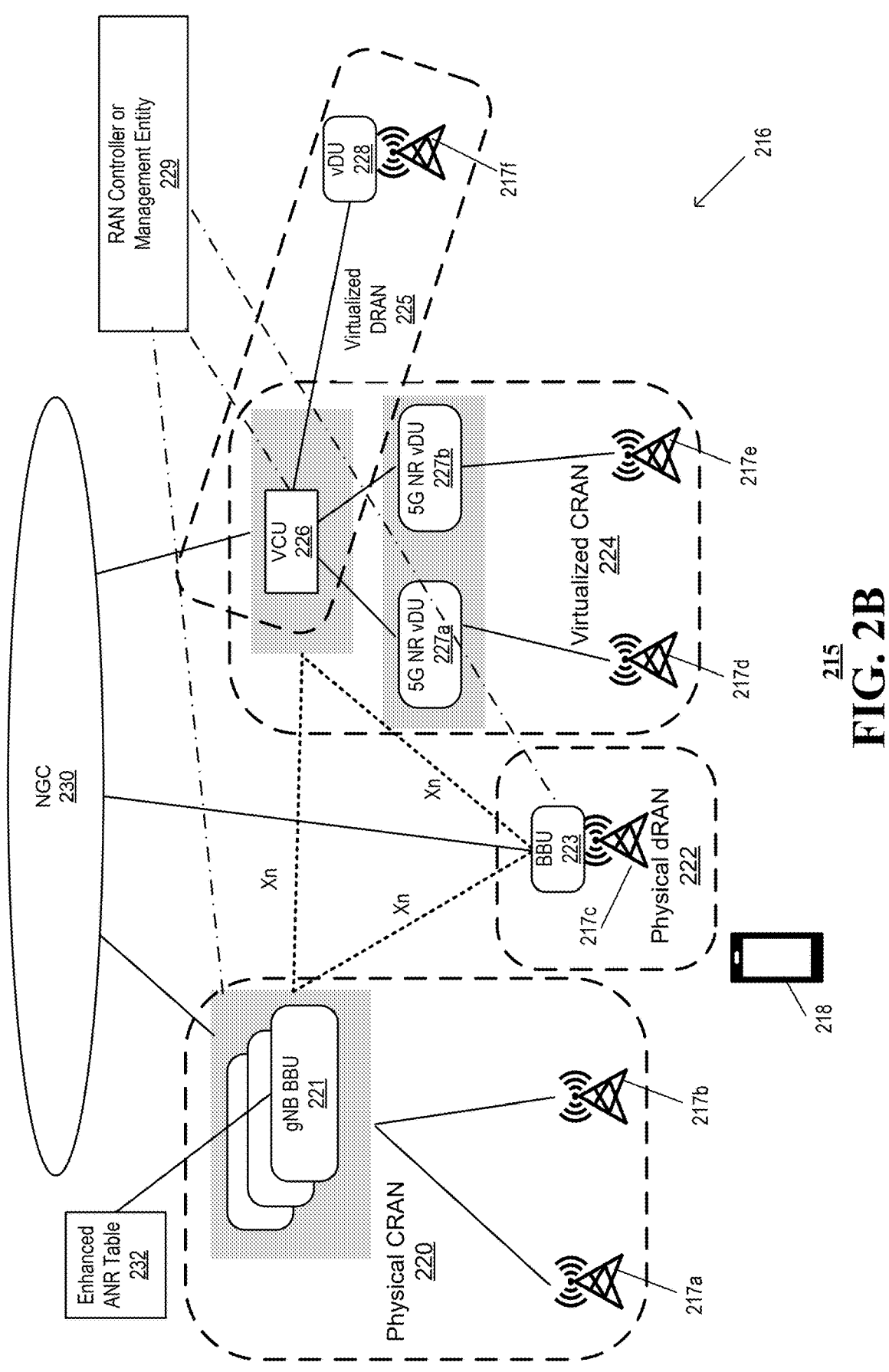
FIG. 2B is a block diagram illustrating an example, non-limiting embodiment of a next generation radio access network (NG-RAN) functioning within the communication network of FIG. 1 in accordance with various aspects described herein.

FIG. 2B is a block diagram illustrating an example, non-limiting embodiment of a next generation radio access network (NG-RAN) 215 functioning within the system 100 of FIG. 1 in accordance with various aspects described herein. The example NG-RAN 215 includes a radio access network 216 including and/or otherwise serving a group of neighboring cell sites 217a through 217f, generally 217, which may include base transceiver stations (BTS) and/or access points (AP) having any one or more of a variety of different configurations. Configuration alternatives include, without limitation, a traditional or classic RAN configuration in which a physical BBU may be located at a centralized location, referred to herein as a centralized, classic RAN (cRAN), or at a cell site location, referred to herein as a distributed, classic RAN (dRAN). Other configuration alternatives include a decomposed RAN, e.g., in which functionality of the BBU may be divided into a distributed unit (DU) adapted for time sensitive RAN functions and a centralized unit (CU) adapted for non-time-sensitive RAN functions. The CU and DU may operate collaboratively to provide RAN functionality of the BBU.

In at least some configurations, one or more of the RAN elements, components and/or functions may be virtualized, e.g., being hosted on a virtual machine as may be supported by a cloud infrastructure. For example, a centralized, classic RAN (cRAN) may be virtualized according to a virtual centralized, classic RAN configuration (vRAN on cRAN) in which a virtualized BBU may be located at a remote or centralized location, i.e., physically dislocated and/or geographically separated from its corresponding cell site 217. Alternatively, a distributed, classic RAN (dRAN) may be virtualized according to a virtual distributed, classic RAN configuration (vRAN on dRAN) in which a virtualized BBU may be located at and/or proximate to its corresponding cell site 217.

Other virtualized RAN configurations may include a virtualized decomposed RAN in which one or more subsystems, components or parts a divided BBU, e.g., CU and DU may be virtualized. According to a virtualized decomposed RAN configurations, a virtual CU (vCU) may reside at a remote or centralized location, i.e., hosted on one or more virtual machines that may be physically dislocated and/or geographically separated from its corresponding cell site 217. Further according to a virtualized decomposed RAN configurations, a virtual DU (vDU) may be distributed to a cell site 271, e.g., hosted on one or more virtual machines residing at and/or proximate to its corresponding cell site 217 and/or at a remote or centralized location, i.e., hosted on one or more virtual machines that may be physically dislocated and/or geographically separated from its corresponding cell site 217.

According to the illustrative example, the NG-RAN 215 includes a physical CRAN 220, which includes two cell sites 217a, 217b supported by one or more physical gNB BBU 221 geographically separated from the cell sites 217a, 217b, e.g., at a remote or centralized location. The example NG-RAN 215 also includes a physical dRAN 222, which includes a cell site 217c and a physical BBU 223 collocated with the cell site 217c.

The example NG-RAN 215 also includes a virtual, centralized RAN (vRAN on CRAN) 224, which includes two cell sites 217d, 217e supported by one or more virtual BBUs. According to the illustrative example, the first vRAN on CRAN cell site 217d is in communication with a first 5G NR vDU 227a, which may be located at a remote, e.g., centralized location. The first 5G NR vDU 227a is in communication with a vCU 226, which may be located at a remote, e.g., centralized location which, in at least some embodiments, may be collocated and/or co-hosted with the corresponding 5G NR vDU 227a. Likewise, the second vRAN on CRAN cell site 217e is in communication with a second 5G NR vDU 227b, which may be located at a remote, e.g., centralized location. The second vDU 227b is in communication with the vCU 226, such that a single vCU 226 is adapted to perform non-real time RAN functions for the first and second 5G NR vDU 227a, 227b.

The example NG-RAN 215 further includes a virtual, distributed RAN (vRAN on DRAN) 225, which includes a cell sites 217f supported by a virtual DU (vDU) 228, hosted on equipment, e.g., a virtual machine, collocated with the cell site 217f. The vDU 228 is in communication with a virtual CU (vCU) 226, which may be located at a remote, e.g., centralized location which, in at least some embodiments, may be collocated and/or co-hosted with the corresponding vDU 228. It is envisioned that in at least some embodiments, the same vCU 226 may support multiple vDUs 227a, 227b, 228.

The example NG-RAN 215 also includes a management entity 229 in communication with equipment of one or more of the example physical CRAN 220, the physical dRAN 222, the vRAN on CRAN 224 and the vRAN on DRAN 225. In at least some embodiments, the management entity 229 may include a RAN controller adapted to facilitate configuration of RAN hardware, firmware and/or functionality. For example, a RAN controller of the management entity 229 may allocate and/or otherwise configure time-sensitive RAN functions to the 5G NR vDU 227a, 227b and/or the vDU 228. Alternatively, or in addition, a RAN controller of the management entity 229 may allocate and/or otherwise configure non-time-sensitive RAN functions to the VCU 226.

One or more of the physical cRAN 220, the physical DRAN, the vRAN on CRAN 224 or the vRAN on DRAN 225 may be in further communication with a core network, e.g., the next generation core (NGC) 230. The NGC 230 may be configured to facilitate delivery of mobile services to wireless communication devices, e.g., user equipment (UE) 218, including mobility of the UE 218 within and across one or more of the neighboring cell sites 217 and/or mobility between cell sites 217 of different mobile network operators.

It is understood that a combination of one or more different configurations, such as those referred to above, may coexist on a network operator's NG-RAN 215 for at least some period of time as new technologies are implemented. The example NG-RAN 215 may include one or more enhanced neighbor relation tables, e.g., enhanced ANR 232. In at least some embodiments, the enhanced ANR table 232 includes enhanced attributes adapted to inform neighboring cell sites 217 regarding RAN configurations of neighboring cell sites 217. For example, the enhanced attributes of the enhanced ANR table 232 may include spatial attribute identifying a neighboring ran cell site 217 as being a traditional, or classic RAN, or a decomposed RAN, e.g., having divided and in at least some embodiments, geographically separated BBU functions. Alternatively, or in addition, the enhanced attributes of the enhanced ANR table 232 may include a hosting infrastructure attribute identifying BBU functionality of a neighboring ran cell site 217 as being implemented according to a physical configuration, a virtual configuration, or a combination of physical and virtual configurations.

Figure 2C:
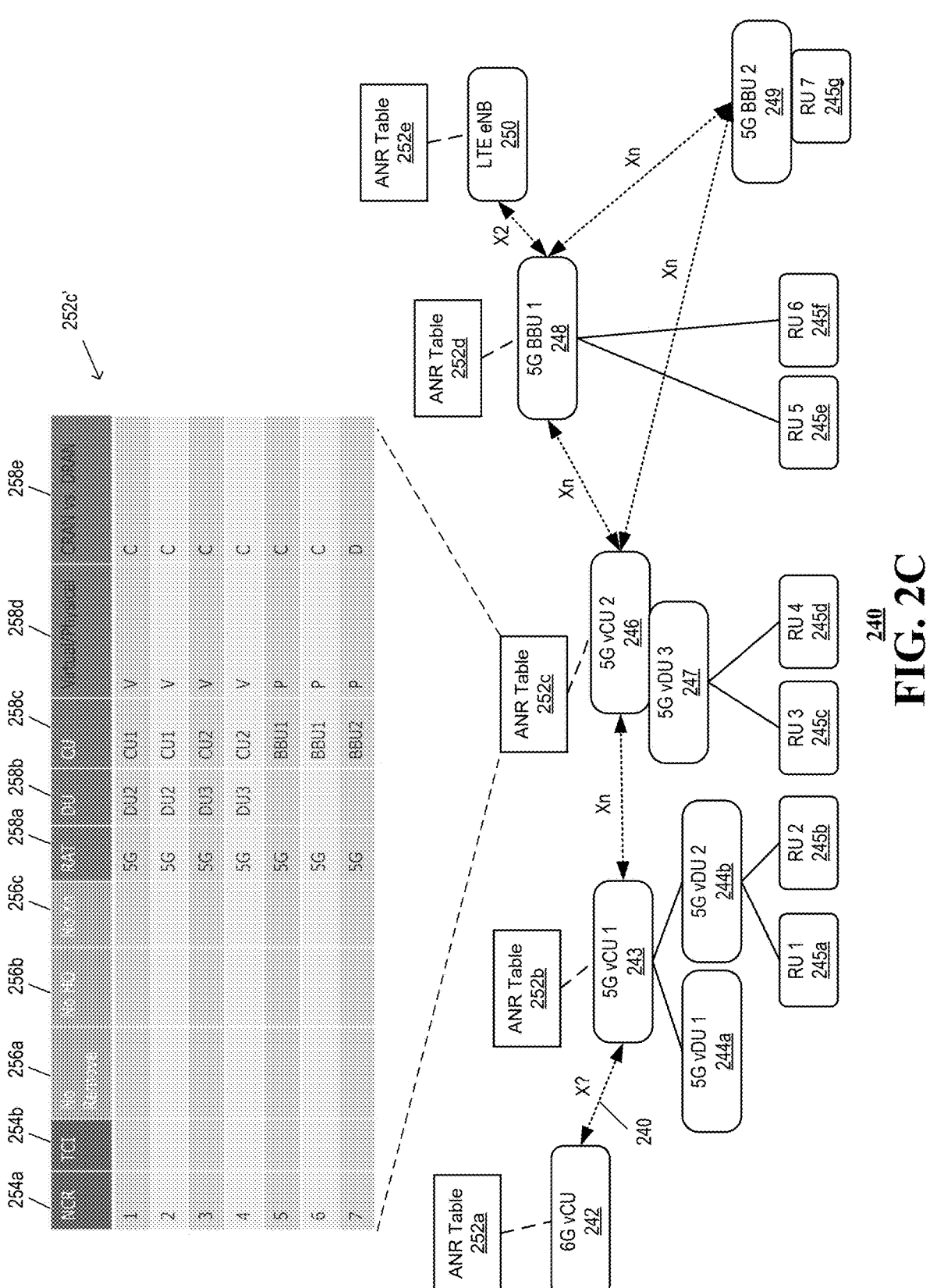
FIG. 2C is a block diagram illustrating an example, non-limiting embodiment of a next generation RAN (NG-RAN) configured for using an enhanced, automated neighbor relations (ANR) table to facilitate intra-radio access technology (RAT) mobility within the communication network of FIG. 1 in accordance with various aspects described herein.

FIG. 2C is a block diagram illustrating an example, non-limiting embodiment of next generation RAN (NG-RAN) 240 configured for using an enhanced, automated neighbor relations (ANR) table to facilitate intra-radio access technology (RAT) mobility within the system 100 of FIG. 1 in accordance with various aspects described herein. The example NG-RAN 240 includes a 5G system portion that includes a first 5G virtual CU (5G vCU_1) 243 supporting a first 5G virtual DU (5G vDU_1) 244a and a second 5G vDU_2 244b. The second 5G vDU_2 244b, in turn, supports a first radio unit (RU 1) 245a and a second radio unit (RU 2) 245b. The example NG-RAN 240 includes a second 5G virtual CU (5G vCU_2) 246 supporting a third 5G virtual DU (5G vDU_3) 247, which, in turn, supports a third radio unit (RU_3) 245c and a fourth radio unit (RU_4) 245d.

The example NG-RAN 240 also includes a first 5G undivided, unified and/or collocated or proximal BBU (5G BBU_1) 248, which, in turn, supports a fifth radio unit (RU_5) 245e, a second 5G undivided, unified and/or collocated or proximal BBU (5G BBU_2) 248, which, in turn, supports a seventh radio unit (RU_7) 245g, a 6G system portion that includes a 6G virtual CU (6G vCU) 242 that may support a 6G virtual DU (not shown), and an LTE eNodeB (eNB) 250. Neighboring RAN processors, e.g., vCUs 242, BBUs and/or eNBs, may be in communication via inter-cell communication channel, e.g., according to one or more X-type messaging protocols, e.g., X2, Xn, X? (future, as yet undefined protocols).

According to the illustrative example, at least some of the vCU for virtual divided BBE 242, 243, 246, the undivided, physical BBE 248, 249, and/or the LTE eNB 250 have access to and/or retain a record of a respective neighbor relations table, e.g., the example automated neighbor relations tables ANR 252a, 252b, 252c, 252d, 252e. A detailed view 252c' of the ANR table 272c retained by the second 5G VCU_2 246 is provided to illustrate example attributes. A first attribute category 254a identifies a neighbor cell relation (NCR), e.g., an NCR table entry reference number. A second attributes category 254b identifies a corresponding neighboring cell according to a cell ID, e.g., a target cell identifier (TCI). The first and second attribute categories 254a, 254b generally relate to neighbor cell identification.

According to the illustrative detailed view 252c', a second attribute category includes attributes as may be defined by a network operator, e.g., via an operation and management (OAM) entity. The OAM defined categories may include a "No Remove" attribute 256a that, if selected, identifies a corresponding neighboring node as a node that may not be removed from the ANR table 252c'. Alternatively, or in addition, the OAM categories may include a "No HO" attribute 256b that, if selected, identifies a corresponding node as a node that may not be selected as a handover target node. Alternatively, or in addition, the OAM categories may include a "No X2" attribute 256c that, if selected, identifies a corresponding node as being unavailable for inter-cell communications, e.g., according to a X2, Xn, or future, as yet undefined X? inter-node interface.

According to the illustrative detailed view 252c', a third attribute category includes enhanced attributes according to the techniques disclosed herein. The enhanced attribute categories may include a radio access technology "RAT" attribute 258a that identifies a radio access technology of the corresponding neighboring node, e.g., 4G, LTE, 5G, 6G. Alternatively, or in addition, the enhanced attribute categories may include a DU identity attribute 258b identifying a distributed unit (DU), e.g., for divided BBU configurations and another CU identity attribute 258c identifying a centralized unit (CU) that may be used to identify a CU of a divided BBU configuration. In at least some embodiments, the CU identity attribute 258c may include an identity of an undivided or unitary BBU. It is understood that an interpretive logic may be employed by the BBU and/or CUs to determine that a CU identity attribute 258c without a corresponding DU identity attribute 258b signifies an undivided BBU configuration. Still other enhanced attributes may include a virtual/physical attribute 258d that identifies a hosting infrastructure configuration, e.g., whether the identified DU and/or CU are virtual or physical, and a CRAN/DRAN attribute 258e that indicates whether the BBU is configured according to a centralized and/or distributed architecture.

It is understood that one or more of the enhanced attributes 258a, 258b, 258c, 258d, 258e of a neighboring cell may be utilized by RAN functions of a source cell. For example, one or more of the enhanced attributes 2758a, 258b, 258c, 258d, 258e of a neighboring may be utilized by RAN functions related to handover events transferring delivery or service to UE. In particular, the enhanced attributes, which include the RAT attribute 258a, may be utilized to facilitate intra-RAT transfers or handovers. For example, the second 5G vCU_2 246 may determine from the enhanced RAT attribute 258a that a handover from a source node associated with RU_3 245c to a target node associated with RU_2 245b, will include an intra-RAT handover from a 5G cell to another 5G cell, or vice versa for a handover in an opposite direction. Similarly, the second 5G vCU_2 246 may determine from the enhanced RAT attribute 258a that a handover from a source node associated with RU_4 245d to a target node associated with RU_5 245e or RU_6 245f, will also include an intra-RAT handover from a 5G cell to another 5G cell, or vice versa for handovers in the opposite direction.

Figure 2D:
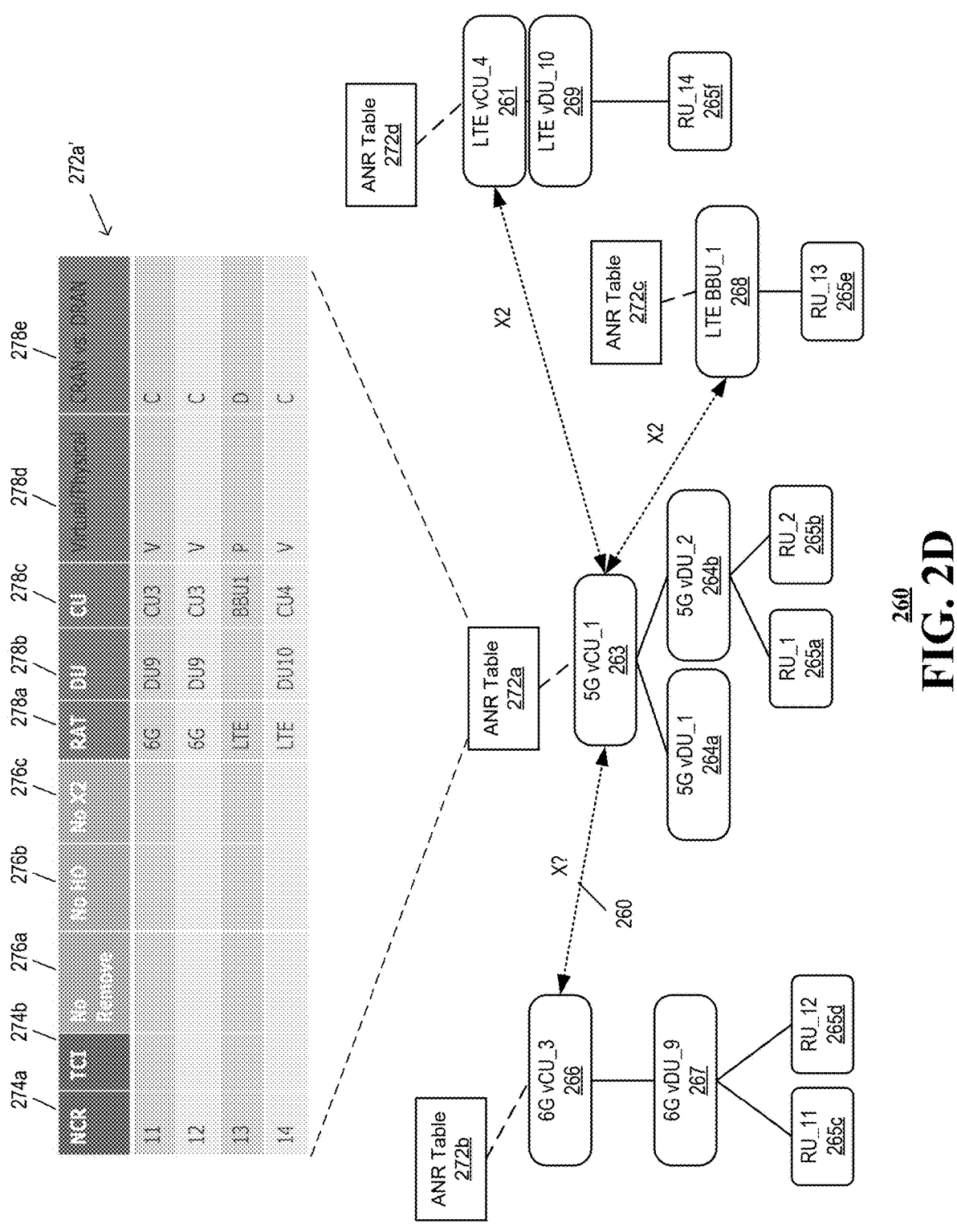
FIG. 2D is a block diagram illustrating an example, non-limiting embodiment of a next generation RAN (NG-RAN) configured for using an enhanced, automated neighbor relations (ANR) table to facilitate inter-RAT (I-RAT) mobility within the communication network of FIG. 1 in accordance with various aspects described herein.

FIG. 2D is a block diagram illustrating an example, non-limiting embodiment of a next generation RAN (NG-RAN) 260 configured for using an enhanced, automated neighbor relations (ANR) table to facilitate inter-RAT (I-RAT) mobility within the system 100 of FIG. 1 in accordance with various aspects described herein. The example NG-RAN 260 includes a 5G system portion that includes a first 5G virtual CU (5G vCU_1) supporting a first 5G virtual DU (5G vDU_1) 264a and a second 5G vDU_2 264b. The second 5G vDU_2 264b, in turn, supports a first radio unit (RU 1) 265a and a second radio unit (RU 2) 265b.

The example NG-RAN 260 also includes a 6G system portion 6G that includes a 6G virtual CU (6G vCU_3) 266 supporting a 6G virtual DU (6G vDU) 267, which, in turn, supports a first radio unit (RU 11) 265c and a second radio unit (RU 12) 265d. The example NG-RAN 260 also includes a physical LTE system portion that includes an LTE BBU 268 supporting an a radio unit (RU 13) 265e, and a virtual LTE system portion that includes an LTE virtual CU (LTE vCU_4) 261 supporting an LTE virtual DU (LTE vDU_10) 269, which, in turn, supports a radio unit (RU 14) 265f.

According to the illustrative example, the vCUs 261, 263, 266 for each of the virtual divided BBE and the undivided, physical LTE BBU 268 have access to and/or retain a record of a respective neighbor relations table, e.g., the example automated neighbor relations (ANR) table 272a, 272b, 272c, 272d, generally 272. A detailed ANR table view 272a' of the 5G ANR table 272a is provided to illustrate example attributes. The example ANR table 272 may include an enhanced ANR table that includes one or more additional attributes than presently available under implemented 3GPP standards. For example, the additional attributes may include one or more of a hosting infrastructure attribute indicating as to whether a RAN utilizes a physical or virtual hosting infrastructure configuration. Alternatively, or in addition, the additional attributes may include one or more of a CU id (e.g., a gNB-CU id) and/or a DU id (e.g., a gNB-CU id), identifying a hierarchical structure of a decomposed and/or divided RAN. Each individual communication node (e.g., 5G NR BTS) does not need to host, store and/or otherwise support an individual ANR table. In at least some embodiments, another component, such as a centralized CU or vCU for vRAN, and/or a BBU for physical RAN, may host the NCR table, including the enhanced ANR table, e.g., on behalf of one or more and up to all the BTSs supported by the CU, and/or the vCU and/or the BBU.

A first attribute category 274a identifies a neighbor cell relation (NCR), e.g., an NCR table entry reference number. A second attributes category 274b identifies a corresponding neighboring cell according to a cell ID, e.g., a target cell identifier (TCI). The first and second attribute categories 274*a*, 274*b* generally relate to neighbor cell identification. According to the illustrative detailed view 272*a*', a second attribute category includes attributes as may be defined by a network operator, e.g., via an operation and management (OAM) entity. The OAM defined categories may include a "No Remove" attribute 276*a* that, if selected, identifies a corresponding neighboring node as a node that may not be removed from the ANR table 272*a*. Alternatively, or in addition, the OAM categories may include a "No HO" attribute 276*b* that, if selected, identifies a corresponding node as a node that may not be selected as a handover target node. Alternatively, or in addition, the OAM categories may include a "No X2" attribute 276*c* that, if selected, identifies a corresponding node as being unavailable for inter-cell communications, e.g., according to a X2, Xn, or future, as yet undefined X? inter-node interface.

According to the illustrative detailed view 272*a*', a third attribute category includes enhanced attributes according to the techniques disclosed herein. The enhanced attribute categories may include a radio access technology "RAT" attribute 278*a* that identifies a radio access technology of the corresponding neighboring node, e.g., 4G, LTE, 5G, 6G. Alternatively, or in addition, the enhanced attribute categories may include a DU identity attribute 278*b* identifying a distributed unit (DU), e.g., for divided BBU configurations and another CU identity attribute 278*c* identifying a centralized unit (CU) that may be used to identify a CU of a divided BBU configuration. In at least some embodiments, the CU identity attribute 278*c* may include an identity of an undivided or unitary BBU. It is understood that an interpretive logic may be employed by the BBU and/or CUs to determine that a CU identity attribute 278*c* without a corresponding DU identity attribute 278*b* signifies an undivided BBU configuration. Still other enhanced attributes may include a virtual/physical attribute 278*d* that identifies a hosting infrastructure configuration, e.g., whether the identified DU and/or CU are virtual or physical, and a CRAN/DRAN attribute 278*e* that indicates whether the BBU is configured according to a centralized and/or distributed architecture.

It is understood that one or more of the enhanced attributes 278*a*, 278*b*, 278*c*, 278*d*, 278*e* of a neighboring cell may be utilized by RAN functions of a source cell. For example, one or more of the enhanced attributes 278*a*, 278*b*, 278*c*, 278*d*, 278*e* of a neighboring may be utilized by RAN functions related to handover events transferring delivery or service to UE. In particular, the enhanced attributes, which include the RAT attribute 278*a*, may be utilized to facilitate inter-RAT transfers or handovers. For example, the first 5G vCU_1 263 may determine from the enhanced RAT attribute 278*a* that a handover from a source node associated with RU_1 265*a* to a target node associated with RU_12 265*d*, will include an inter-RAT handover from a 5G cell to a 6G cell, or vice versa for a handover in an opposite direction. Similarly, the first 5G vCU_1 263 may determine from the enhanced RAT attribute 278*a* that a handover from a source node associated with RU_1 265*a* to a target node associated with RU_13 265*e* or RU_14 265*f*, will include an inter-RAT handover from a 5G cell to an LTE cell, or vice versa for handovers in the opposite direction.

Figure 2E:
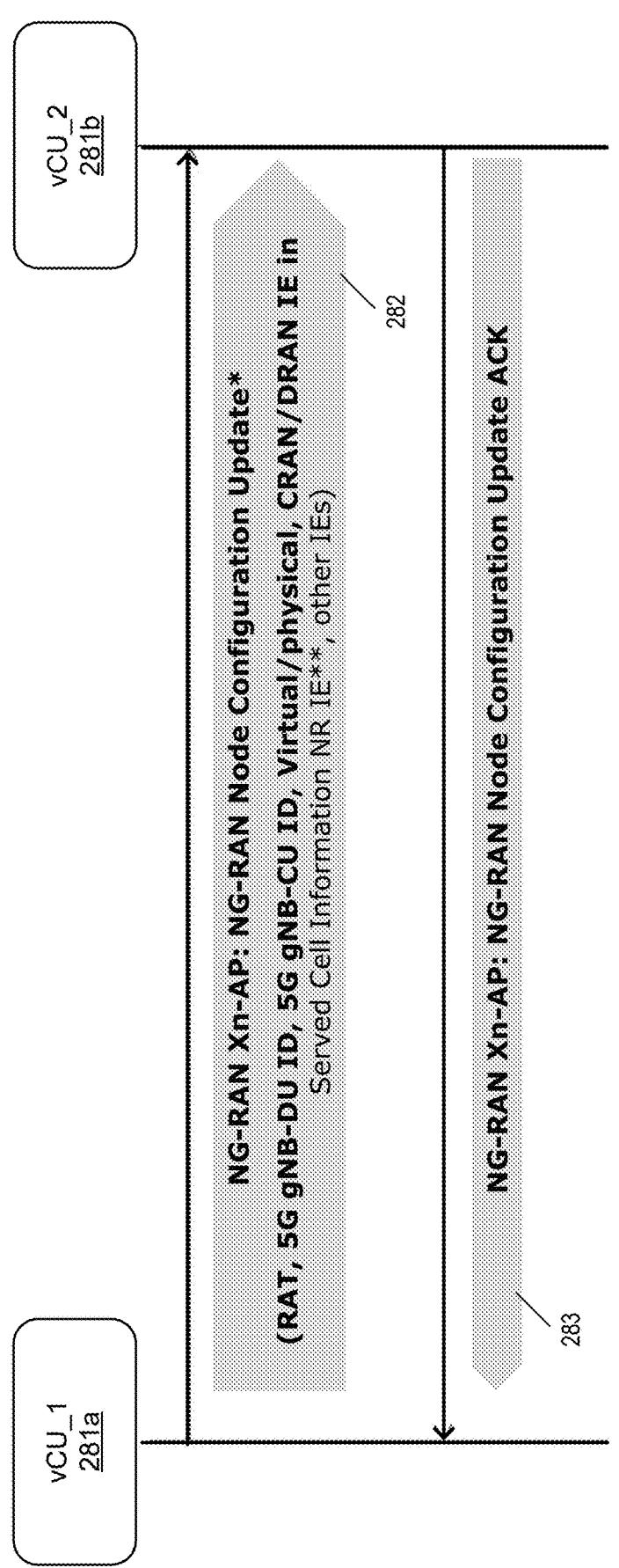
FIG. 2E is a block diagram illustrating an example, non-limiting embodiment of an inter-nodal message exchange configured for supporting enhanced ANR tables within an NG-RAN functioning within the communication network of FIG. 1 in accordance with various aspects described herein.

FIG. 2E is a block diagram illustrating an example, non-limiting embodiment of an inter-nodal message exchange 280 configured for supporting enhanced ANR tables within an NG-RAN functioning within the system 100 of FIG. 1 in accordance with various aspects described herein. According to the illustrative example, messages may be exchanged between RAN elements serving neighboring cell sites to facilitate RAN operations, e.g., mobility. The messages may be exchanged between RAN elements, e.g., between gNBs, via a defined interface, such as a 4G LTE X2 interface, a 5G NR Xn interface, and/or any other suitable interface and/or other communication channel.

The inter-nodal message exchange includes a first message 282 directed from RAN equipment of a first cell site, e.g., a first vCU_1 281*a*, to RAN equipment of a neighboring cell site, e.g., a second vCU_2 281*b*. In at least some embodiments, the first message 282 includes a RAN configuration update message adapted to provide RAN configuration information of the first cell site, e.g., the first vCU_1 281*a* to the neighboring cell site, e.g., the second vCU_2 281*b*. According to the illustrative example, the RAN configuration update message may include an identity of the first cell site, e.g., an identity of the first vCU_1 and/or a corresponding first vDU_1, and/or a first gNB identifier. In at least some embodiments, the RAN configuration update message may include one or more of a radio access technology (RAT) of the first cell site, a DU identifier (ID), a CU ID, an indication whether the BBU includes physical and/or virtual configuration, and/or whether the RAN includes a cRAN and/or DRAN. It is envisioned the configuration information may be conveyed within the message according to one or more corresponding information elements (IE), which may be identified and/or otherwise specified to facilitate interoperability among different equipment vendors and/or different mobile network operators.

In at least some embodiments, the first message 282 may require and/or otherwise prompt or initiate a response message 283 directed from the second cell site to the first cell site, e.g., from the second vCU_2 281*b* to the first vCU_1 281*a*. By way of example, the response message may provide an acknowledgement that the message was received and/or that configuration information provided in the first message was received and/or otherwise interpreted.

Figure 2F:
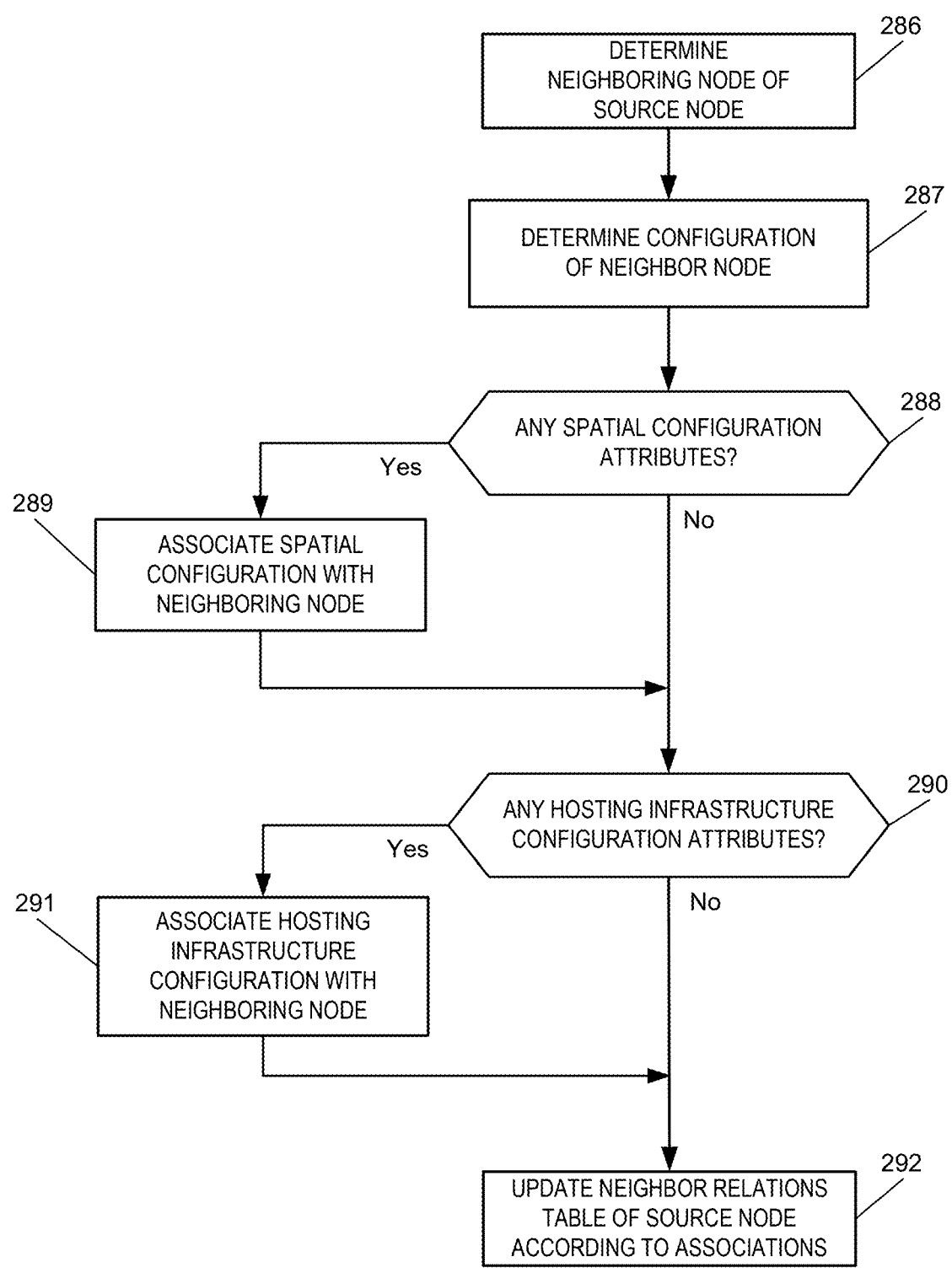
FIG. 2F depicts an illustrative embodiment of a process for configuring an enhanced ANR table in accordance with various aspects described herein.

FIG. 2F depicts an illustrative embodiment of a process 285 for configuring an enhanced ANR table in accordance with various aspects described herein. According to the example process, a neighboring node of source node is determined at 286. This may be accomplished according to a neighbor node discover process as may be defined according to 4G and/or 5G discovery processes. Alternatively, or in addition, discovery may include receiving configuration information from an operation and management entity, from unsolicited messages provided by neighboring nodes, from responses to request for neighbor node identification, e.g., as may be initiated by a source node to identify potential target nodes for handover events, and the like.

A configuration of the neighboring node may be determined at 287, e.g., according to information elements of a message received from a neighboring node. The information elements may include one or more of a spatial configuration and/or a hosting infrastructure configuration.

According to the example process 285, a determination is made at 288, as to whether the configuration of the neighboring node includes a spatial configuration attribute. To the extent it is determined at 288 that the configuration of the neighboring node includes a spatial configuration attribute, the spatial configuration is associated, at 289, with an identity of the neighboring node. Whether or not it is determined at 288 that the configuration of the neighboring node includes a spatial configuration attribute, the example process 285 continues, determining, at 290, whether the configuration of the neighboring node includes a hosting infrastructure configuration attribute. To the extent it is determined at 290 that the configuration of the neighboring node includes a hosting infrastructure configuration attribute, the hosting infrastructure configuration is associated, at 291, with an identity of the neighboring node. Whether or not it is determined at 290 that the configuration of the neighboring node includes a hosting infrastructure configuration attribute, the example process 285 continues, updating, at 292, a neighbor relations table according to any identified spatial and/or hosting infrastructure configurations.

It is understood that the neighbor relations table may include an enhanced neighbor relations table that may be updated manually and/or automatically according to the spatial and/or hosting infrastructure configuration attributes. Accordingly, the neighbor relations table may be accessed, stored and/or otherwise maintained by a cell site, e.g., a source node of a mobile network, to provide identification, and in at least some embodiments, configuration information of neighboring mobile nodes. It is further understood that the neighboring nodes may serve as target nodes for handover events, e.g., as may be implemented to accommodate efficient management of mobile network operator resources and/or to accommodate mobility of user equipment accessing mobile services via the mobile network operator resources.

In some embodiments, the example process 285 may be conducted during an initial configuration process, e.g., configuration and/or reconfiguration of a mobile network to add, delete and/or modify equipment including cell site resources and/or resources of a RAN supporting the cell sites. Alternatively, or in addition, the process 285 may be conducted periodically, e.g., according to a schedule, such as a maintenance schedule, which may be performed according to a daily, weekly, monthly, seasonal schedule. Alternatively, or in addition, the process 285 may be conducted responsive to an event, such as a reconfiguration of equipment of a cell set including supporting RAN resources. In at least some embodiments, the example process 285 may be initiated by a source node, a target node, or both source and target nodes. The process 285 may initiated and/or performed responsive to network traffic conditions and/or patterns, according to numbers of active and/or otherwise attached mobile devices, according to any combination of one or more of mobile device technologies, capabilities, subscription levels, priorities, and the like.

Figure 2G:
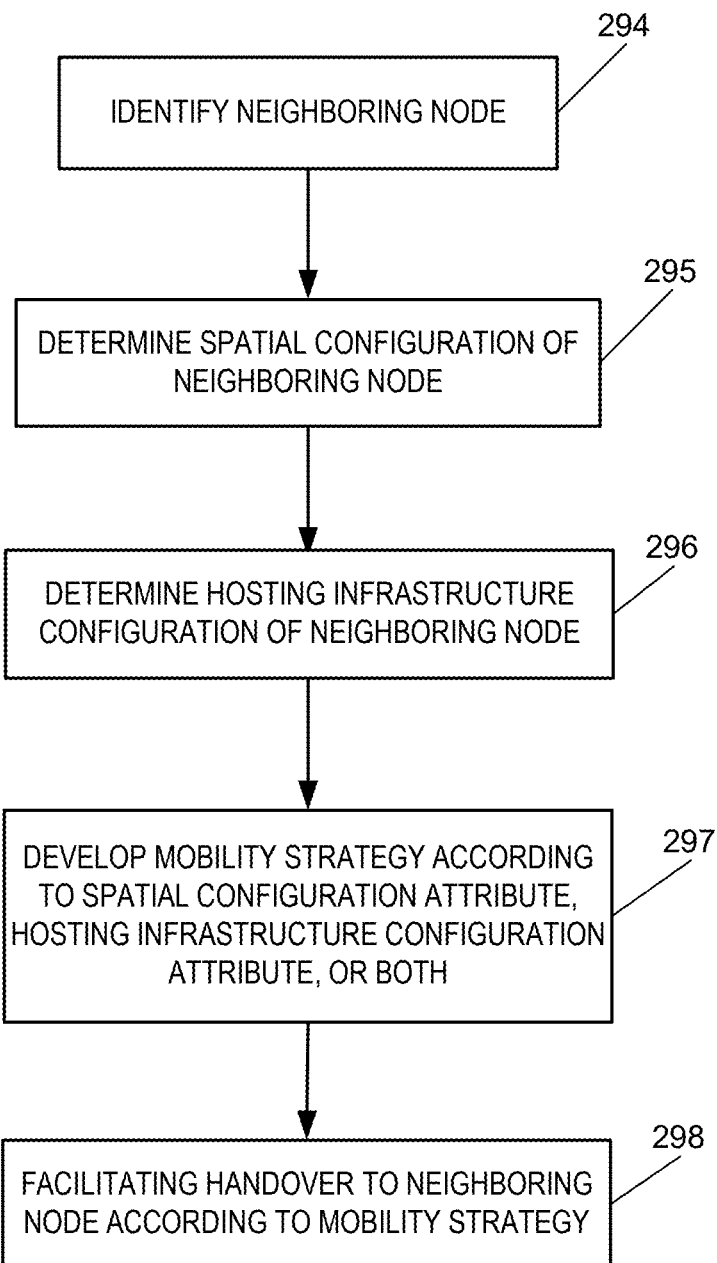
FIG. 2G depicts an illustrative embodiment of a process for managing mobility according to an enhanced ANR table in accordance with various aspects described herein.

FIG. 2G depicts an illustrative embodiment of a process 293 for managing mobility according to an enhanced ANR table in accordance with various aspects described herein. According to the example process 293, a neighboring node of a wireless communication network is identified at 294. The wireless communication network may include a wireless mobile communication network configured to wireless deliver services to user equipment. The user equipment (UE) may include, without limitation, stationary devices, such as stationary communications equipment and/or smart devices, e.g., Internet-enabled devices, smart appliances and the like according to the Internet of Things (IoT). Other examples of UE include smart phones, smart watches, portable computers, tablet devices, smart vehicles, drones and the like. The wireless mobile communications network may operate according to one or more mobility protocols, such as those established by the 3$^{rd}$ Generation Partnership Project (3GPP), to support delivery of one or more mobile services to wireless communication devices. Mobile services include, without limitation, voice, data, video, streaming media, machine type communications (MTC), automation, autonomous operation of machines, e.g., robots, vehicles, drones, and so on. Mobility protocols include, without limitation, any of the examples disclosed herein and/or otherwise generally known, including 4G, LTE, 5G, New Radio (NR), 6G, Next Generation (NG), and beyond, e.g., 5G+, 6G+, 7G A determination is made at 295 as to a spatial configuration of the neighboring node. In at least some embodiments, a spatial configuration identifies an architecture of a baseband unit (BBU) of a wireless communications node, e.g., a cell site. According to the spatial configuration, the BBU may be identified as an undivided, or unitary device and/or system collocated and/or within a proximal relationship that supports time sensitive, e.g., real-time RAN functions that might otherwise be hindered and/or otherwise compromised without such a unified and/or proximal relationship. Further according to the spatial configuration, the BBU may be identified as a divided, distributed device and/or system in which RAN functionality may be characterized according to time sensitive or real-time RAN functions and non-time sensitive or non-real time RAN functions. It is understood that a first subsystem, time-sensitive RAN functions may be allocated to a portion or segment of a divided BBU may be collocated and/or within a proximal relationship with the cell site, while non-time-sensitive RAN functions may be allocated to another portion or segment of the divided BBU, which may be remote, e.g., geographically separated from the cell site.

A determination is made at 296 as to a hosting infrastructure configuration of the neighboring node. A hosting infrastructure may identify whether any portion of a neighboring cell site is hosted according to a physical infrastructure, e.g., in which dedicated hardware is configured for the neighboring cell site from a virtual infrastructure in which at least a portion of the neighboring cell site is hosted on a virtual machine, e.g., according to a cloud infrastructure. For example, a BBU unit may be implemented according to a physical configuration, a virtual configuration or a combination of both. For an undivided BBU, RAN functions may be performed using a physical system, e.g., using dedicated hardware. Alternatively, the RAN functions of an undivided BBU may be performed by a virtual machine that may be collocated and/or proximal to the cell site, or at some other, e.g., centralized location. For divided BBU configurations, time-sensitive RAN functions may be performed by a physical host system, e.g., using dedicated hardware, while non-time-sensitive RAN functions may be performed on a virtual machine configured, e.g., according to a cloud infrastructure. Alternatively, for divided BBU configurations, non-time-sensitive RAN functions may be performed by a physical host system, e.g., using dedicated hardware, while time-sensitive RAN functions may be performed on a virtual machine configured, e.g., according to a cloud infrastructure. In at least some non-physical, e.g., virtual, configurations of a divided BBU, both time-sensitive and non-time sensitive RAN functions may be performed on a virtual machine configured, e.g., according to a cloud infrastructure.

A mobility strategy is developed at 297 according to the determined spatial configuration, the determined hosting infrastructure configuration, or a combination of both. It is understood that the various configurations disclosed herein may offer certain advantages and/or disadvantages that could affect and/or otherwise impact delivery of services to wireless devices, including mobile wireless devices. For example, a divided BBU may provide a CU configured to support multiple DU. To the extent DU of neighboring cell sites are supported by the same CU, there may be an advantage in managing delivery of services. Consider a fast-moving UE that may require an expedient handover to avoid any interruption to service. In such instances, a shared CU may allow for sharing of cell site and/or UE context in an expedient and efficient manner. For example, such information may be exchanges without necessarily requiring an exchange of messages over an inter-node channel, such as the example message exchange 280 (FIG. 2E).

A handover of a mobile communication device to a neighboring node is facilitated at 298. For example, enhanced attributes of neighboring nodes relating to one or more of the spatial configuration and/or hosting infrastructure configuration may be interpreted to manage a handover event.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
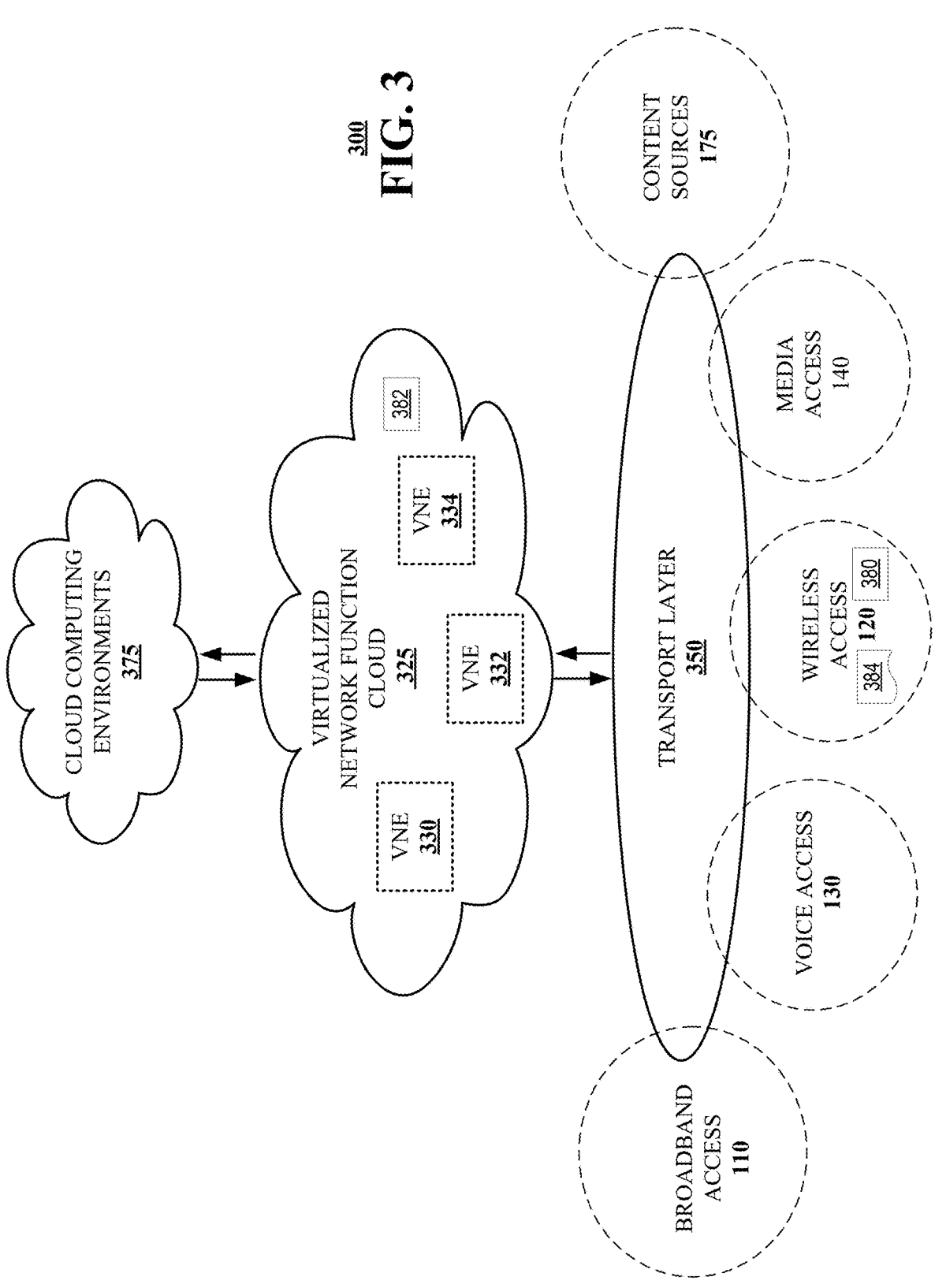
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 200, 215, 240, 260, message exchange 280 and processes 285, 293 presented in FIGS. 1, 2A, 2B, 2C, 2D, 2E, 2F, 2G and 3. For example, virtualized communication network 300 can facilitate in whole or in part determining, with respect to a mobile communication node, one of a spatial configuration, a hosting infrastructure configuration, or a combination of both, for a neighboring mobile communication node, wherein the spatial configuration distinguishes a centralized configuration in which a baseband processor is remote from an RF unit at the mobile node site and a distributed configuration in which the baseband processor is collocated with the RF unit at the mobile node site. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332,

334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

In at least some embodiments, one or more base transceiver stations (BTS) of the wireless access 120 may be configured with a local baseband processing unit 380 configured to perform baseband processing related to mobile communications supported by the BTS. In some embodiments, the local baseband processing unit 380 is a unitary system, e.g., residing at or near the BTS. Alternatively, or in addition, the local baseband processing unit 380 comprises a distributed component of a divided baseband processing system configured to function cooperatively with a remote baseband processing unit 382 physically spaced apart, e.g., remote from the BTS, for example at a centralized location. According to the divided configuration, baseband processing activity is distributed among the local baseband processing unit 380 and the remote baseband processing unit 382.

It is understood that one or more of the unitary baseband processing unit 380 or the local and/or remote processing units 380, 382 of the divided configuration may be hosted according to a physical infrastructure, e.g., utilizing dedicated hardware. Alternatively, or in addition, at least a portion of the local and/or remote processing units 380, 382, may be hosted according to a virtual infrastructure in which at least a portion of the neighboring mobile communication node is hosted on a virtual machine, e.g., according to a cloud infrastructure. In at least some embodiments, the BTS may have access to and/or otherwise retain and/or update a record of neighboring cell configurations.

By way of illustrative example, a BTS of the wireless access 120 may contain a neighbor cell relations table (NCRT) 384 identifying one or more neighboring cells as well as related attributes. In at least some embodiments, the related neighboring cell attributes may include configuration information that may include one or more of an indication of whether the neighboring cell's baseband processing unit includes a divided configuration or an undivided or unitary configuration. Alternatively, or in addition, related neighboring cell attributes may include hosting infrastructure configuration information that may include an indication of whether the neighboring cell's baseband processing unit includes a physical hosted configuration and/or a virtual hosted configuration. For divided configurations, it is understood that the local and remote processing units 380, 382 may utilize the same or different combinations of hosting infrastructure configurations. In some embodiments, attributes of the NCRT may be entered and/or updated manually, e.g., during a system configuration and/or operation and maintenance activity. Alternatively, or in addition, attributes of the NCRT may be entered and/or updated automatically, e.g., according to an automated neighbor relations (ANR) function. In at least some embodiments, the ANR function may be adapted to determine a divided and/or undivided configuration of a baseband processor of a neighboring cell. Alternatively, or in addition, the ANR function may be adapted to determine a hosting infrastructure configuration of the baseband processor of the neighboring cell.

Figure 4:
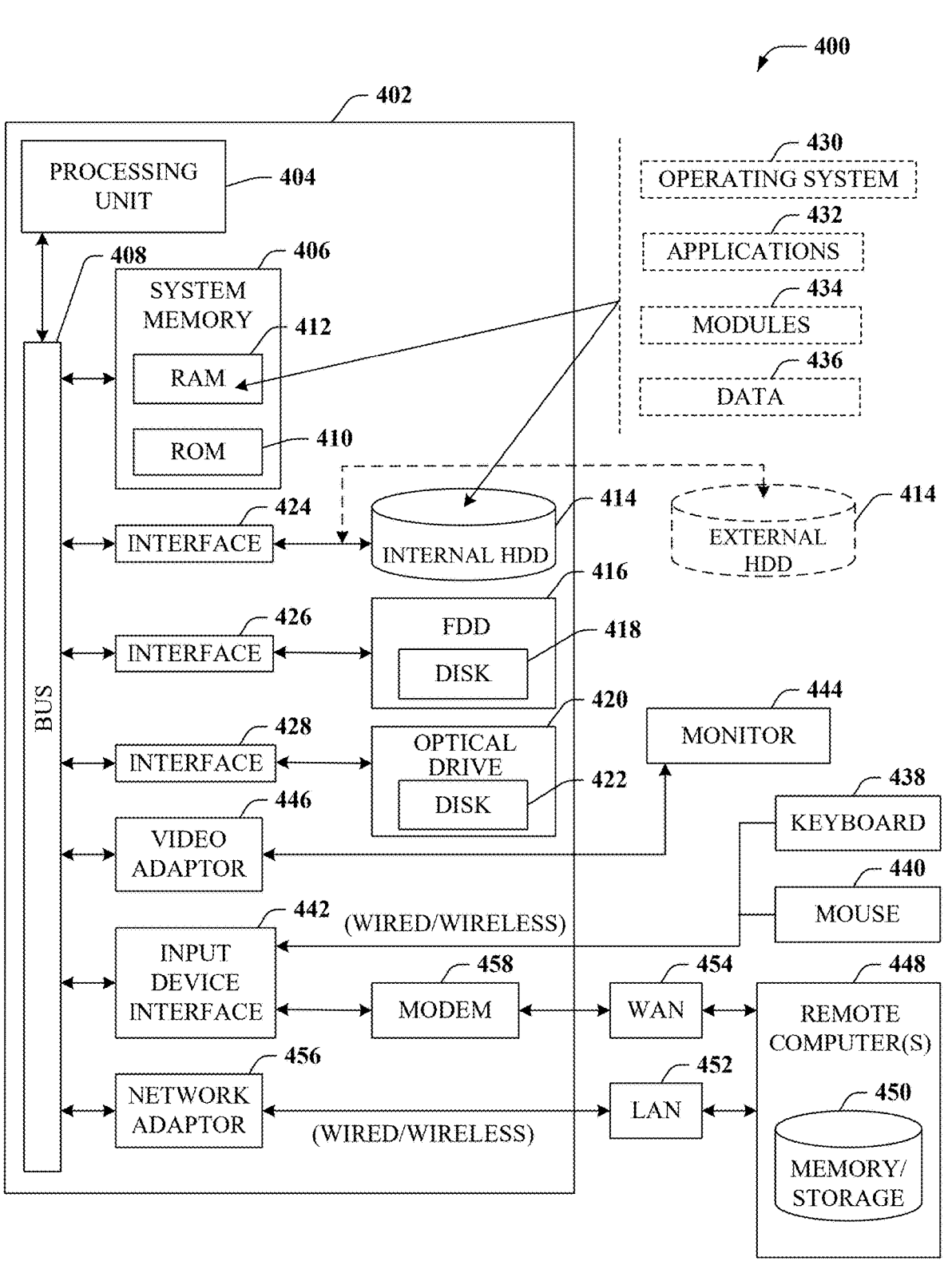
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, BTS 207, ANR function 206, gNB BBU 221, BBU 223, vCU 226, vDU 227a, 227b, vDU 228, RAN controller or management entity 229, any of the vCUs, vDUs, BBUs, eNBs of FIGS. 2C, 2D, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining, with respect to a mobile communication node, one of a spatial configuration, a hosting infrastructure configuration, or a combination of both, for a neighboring mobile communication node, wherein the spatial configuration distinguishes a centralized configuration in which a baseband processor is remote from an RF unit at the mobile node site and a distributed configuration in which the baseband processor is collocated with the RF unit at the mobile node site. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
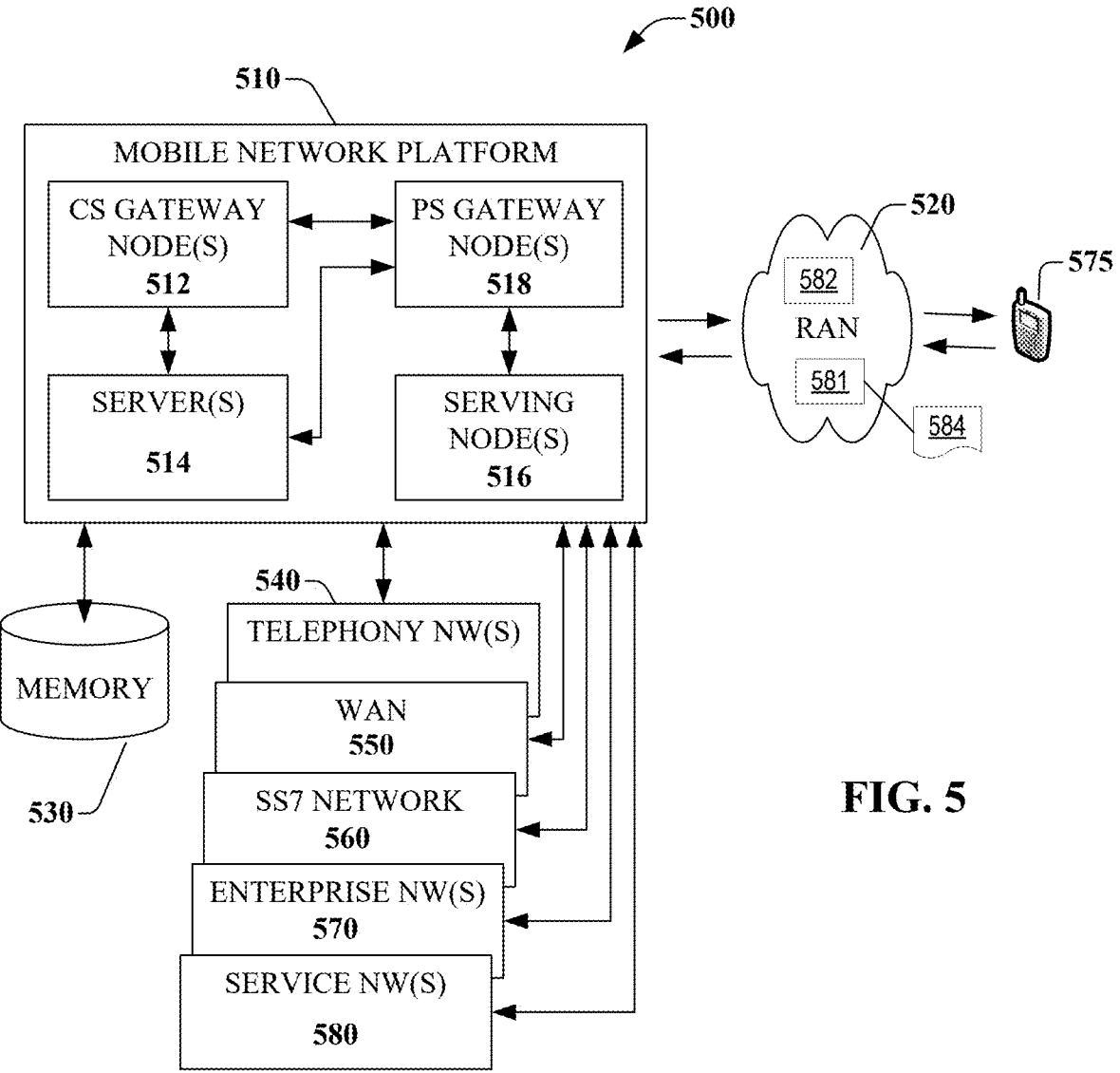
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining, with respect to a mobile communication node, one of a spatial configuration, a hosting infrastructure configuration, or a combination of both, for a neighboring mobile communication node, wherein the spatial configuration distinguishes a centralized configuration in which a baseband processor is remote from an RF unit at the mobile node site and a distributed configuration in which the baseband processor is collocated with the RF unit at the mobile node site. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1($s$) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, one or more base transceiver stations (BTS) of the RAN 520 may be configured with a local baseband processing unit 581 configured to perform baseband processing related to mobile communications supported by the BTS. In some embodiments, the local baseband processing unit 581 is a unitary system, e.g., residing at or near the BTS. Alternatively, or in addition, the local baseband processing unit 581 comprises a distributed component of a divided baseband processing system configured to function cooperatively with a remote baseband processing unit 582 physically spaced apart, e.g., remote from the BTS, for example at a centralized location. According to the divided configuration, baseband processing activity is distributed among the local baseband processing unit 581 and the remote baseband processing unit 582.

It is understood that one or more of the unitary baseband processing unit 380 or the local and/or remote processing units 581, 582 of the divided configuration may be hosted according to a physical infrastructure, e.g., utilizing dedicated hardware. Alternatively, or in addition, at least a portion of the local and/or remote processing units 581, 582, may be hosted according to a virtual infrastructure in which at least a portion of the neighboring mobile communication node is hosted on a virtual machine, e.g., according to a cloud infrastructure. In at least some embodiments, the BTS may have access to and/or otherwise retain and/or update a record of neighboring cell configurations.

By way of illustrative example, a BTS of the RAN 520 may contain a neighbor cell relations table (NCRT) 584 identifying one or more neighboring cells as well as related attributes. In at least some embodiments, the related neighboring cell attributes may include configuration information that may include one or more of an indication of whether the neighboring cell's baseband processing unit includes a divided configuration or an undivided or unitary configuration. Alternatively, or in addition, related neighboring cell attributes may include hosting infrastructure configuration information that may include an indication of whether the neighboring cell's baseband processing unit includes a physical hosted configuration and/or a virtual hosted configuration. For divided configurations, it is understood that the local and remote processing units 581, 582 may utilize the same or different combinations of hosting infrastructure configurations. In some embodiments, attributes of the NCRT may be entered and/or updated manually, e.g., during a system configuration and/or operation and maintenance activity. Alternatively, or in addition, attributes of the NCRT may be entered and/or updated automatically, e.g., according to an automated neighbor relations (ANR) function. In at least some embodiments, the ANR function may be adapted to determine a divided and/or undivided configuration of a baseband processor of a neighboring cell. Alternatively, or in addition, the ANR function may be adapted to determine a hosting infrastructure configuration of the baseband processor of the neighboring cell.

Figure 6:
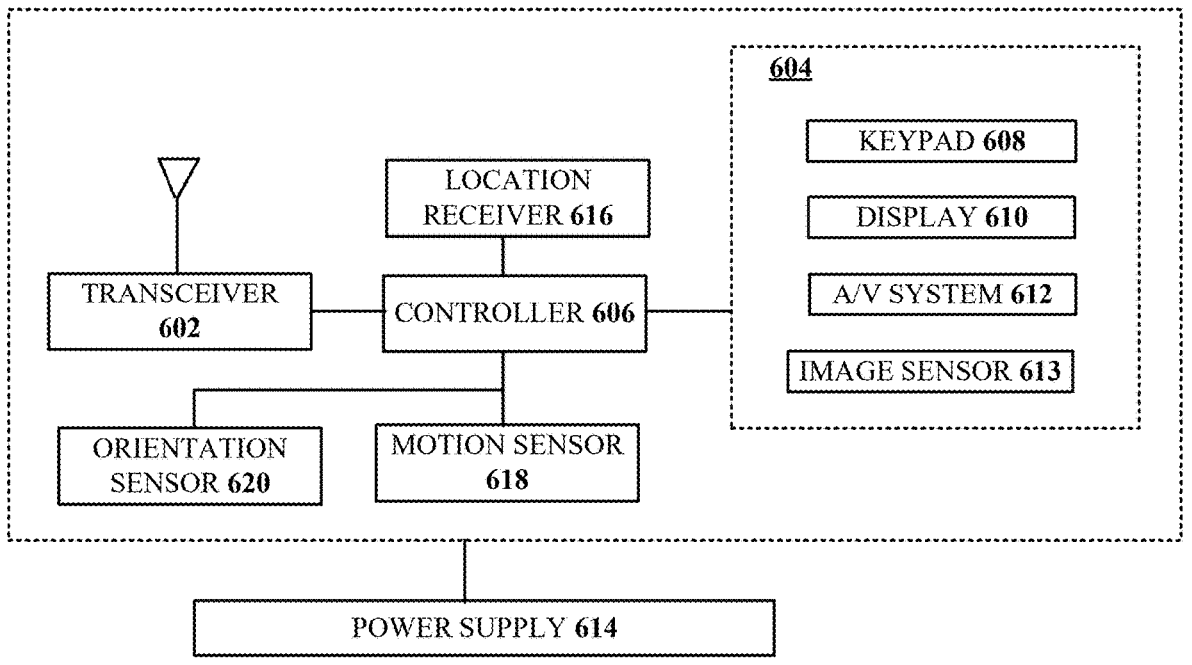
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining, with respect to a mobile communication node, one of a spatial configuration, a hosting infrastructure configuration, or a combination of both, for a neighboring mobile communication node, wherein the spatial configuration distinguishes a centralized configuration in which a baseband processor is remote from an RF unit at the mobile node site and a distributed configuration in which the baseband processor is collocated with the RF unit at the mobile node site. The hosting infrastructure configuration distinguishes a physical infrastructure, e.g., dedicated hardware configured for the neighboring mobile communication node from a virtual infrastructure in which at least a portion of the neighboring mobile communication node is hosted on a virtual machine, e.g., according to a cloud infrastructure.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   detecting, by a processing system including a processor, a neighboring communication node of a plurality of communication nodes of a wireless mobile communication network, wherein the neighboring communication node comprises a baseband processor in communication with a radio frequency (RF) subsystem;
   identifying, by the processing system, a spatial configuration of the neighboring communication node, wherein the spatial configuration comprises one of a divided configuration, in which the baseband processor is divided into a centralized component geographically separated from a distributed component proximal to the RF subsystem, and an undivided configuration, in which the baseband processor is unitary component proximal to the RF subsystem; and
   storing, by the processing system, a first association of the spatial configuration with an indication of the neighboring communication node to obtain a stored first association of the spatial configuration, wherein the stored first association of the spatial configuration facilitates mobility of user equipment within the wireless mobile communication network.

2. The method of claim 1, wherein storing of the first association further comprises:
   updating, by the processing system, a neighbor relations table according to the first association.

3. The method of claim 2, wherein the updating further comprises:
   automatically updating, by the processing system and without human intervention, the neighbor relations table according to the first association, wherein the neighbor relations table comprises an automated neighbor relations table.

4. The method of claim 1, wherein a base transceiver station comprising the RF subsystem is configured to provide wireless mobility coverage within a geographic region.

5. The method of claim 1, wherein the identifying the spatial configuration of the neighboring communication node further comprises:
   receiving, by the processing system, a message identifying the spatial configuration of the neighboring communication node.

6. The method of claim 5, wherein the message comprises an inter-nodal message originating at a communication node of the plurality of communication nodes.

7. The method of claim 5, wherein the receiving the message further comprises:
   receiving, by the processing system, the message via one of a $3^{rd}$ Generation Partnership Project (3GPP) X2 interface, a 3GPP Xn interface, or a combination thereof.

8. The method of claim 5, wherein the message comprises an information element indicating the spatial configuration.

9. The method of claim 1, further comprising:
   identifying, by the processing system, a hosting infrastructure configuration of the neighboring communication node, wherein the hosting infrastructure configuration distinguishes a physical configuration, in which the baseband processor is a physical baseband processor hosted on dedicated compute resources of a base transceiver station, from a virtual configuration, in which the baseband processor is a virtual baseband processor hosted on a virtual machine; and
   storing, by the processing system, a second association of the hosting infrastructure configuration with an indication of the neighboring communication node.

10. The method of claim 9, wherein storing of the first association further comprises:
    updating, by the processing system, a neighbor relations table according to the second association.

11. The method of claim 10, wherein the updating further comprises:
    automatically updating, by the processing system and without human intervention, the neighbor relations table according to the second association, wherein the neighbor relations table comprises an automated neighbor relations table.

12. The method of claim 10, wherein the identifying the hosting infrastructure configuration of the neighboring communication node further comprises:
    receiving, by the processing system, a message identifying the hosting infrastructure configuration of the neighboring communication node.

13. The method of claim 12, wherein the message comprises an inter-nodal message originating at a communication node of the plurality of communication nodes.

14. The method of claim 1, wherein the indication of the neighboring communication node comprises a target cell identification value.

15. The method of claim 1, wherein the spatial configuration comprises attributes, and wherein the stored first association of the spatial configuration facilitates an optimization of mobility of user equipment within the wireless mobile communication network according to attributes of the spatial configuration.

16. A non-transitory, machine-readable medium, comprising executable instructions that, when executed by a processing system including a processor, facilitate performance of operations, the operations comprising:
    identifying a neighboring communication node of a plurality of communication nodes of a wireless mobile communication network, wherein the neighboring communication node comprises a baseband processor in communication with a radio frequency (RF) subsystem;
    determining a spatial configuration of the neighboring communication node, wherein the spatial configuration comprises one of a divided configuration, in which the baseband processor comprises a centralized unit geographically separated from the RF subsystem and a distributed unit proximal to the RF subsystem, and an undivided configuration, in which the baseband processor is an undivided baseband unit proximal to the RF subsystem; and associating the spatial configuration with an indication of the neighboring communication node to obtain a first association of the spatial configuration, wherein the first association of the spatial configuration facilitates mobility of user equipment within the wireless mobile communication network.

17. The non-transitory, machine-readable medium of claim 16, wherein the operations further comprise:

determining a hosting infrastructure configuration of the neighboring communication node, wherein the hosting infrastructure configuration distinguishes a physical configuration, in which the baseband processor comprises a physical baseband processor hosted on a dedicated compute resource of a base transceiver station, from a virtual configuration, in which the baseband processor comprises a virtual baseband processor hosted on a virtual machine; and associating the hosting infrastructure configuration with an indication of the neighboring communication node.

18. The non-transitory, machine-readable medium of claim 17, wherein one of the spatial configuration, the hosting infrastructure configuration, or both facilitate optimization of mobility of the user equipment within the wireless mobile communication network.

19. A system, comprising:

a processing system including a processor; and a memory that stores executable instructions that, when executed by the processing system, facilitate performance of operations, the operations comprising:

determining, in relation to a communication node of a wireless communication network, a neighboring communication node of a plurality of communication nodes of the wireless communication network, wherein the neighboring communication node comprises a baseband processor in communication with a radio frequency (RF) subsystem;

determining one of a spatial configuration of the neighboring communication node, a hosting infrastructure configuration of the neighboring communication node, or a combination thereof, wherein the spatial configuration comprises one of a divided configuration, in which the baseband processor comprises a centralized processor geographically separated from a distributed unit proximal to the RF subsystem, and an undivided configuration, in which the baseband processor is proximal to the RF subsystem, and wherein the hosting infrastructure configuration distinguishes a physical configuration, in which the baseband processor is hosted on dedicated compute resources allocated to a base transceiver station, from a virtual configuration, in which the baseband processor is a virtual baseband processor hosted on virtual machine; and associating one of the spatial configuration, the hosting infrastructure configuration, or the combination thereof, with an indication of the neighboring communication node to obtain an association, wherein the association facilitates mobility of user equipment within the wireless communication network.

20. The system of claim 19, wherein the operations further comprise:

storing the association in a neighbor relations table of the communication node.

* * * * *